United States Patent [19]
Yoshioka et al.

[11] Patent Number: 5,401,052
[45] Date of Patent: Mar. 28, 1995

[54] VEHICLE SUSPENSION DEVICE FOR STABILIZING STEERING CHARACTERISTICS

[75] Inventors: Tohru Yoshioka; Tetsuro Butsuen; Yasunori Yamamoto, all of Hiroshima, Japan

[73] Assignee: Mazda Motor Corporation, Hiroshima, Japan

[21] Appl. No.: 868,852

[22] Filed: Apr. 16, 1992

[30] Foreign Application Priority Data

| Apr. 17, 1991 | [JP] | Japan | 3-085140 |
| Jul. 31, 1991 | [JP] | Japan | 3-191477 |
| Aug. 19, 1991 | [JP] | Japan | 3-207016 |

[51] Int. Cl.$^6$ ............................................. B60G 17/015
[52] U.S. Cl. ................................... 280/707; 364/424.05
[58] Field of Search ................ 280/707; 188/299, 317; 364/424.05

[56] References Cited

U.S. PATENT DOCUMENTS

| 4,555,126 | 11/1985 | Ishimitsu et al. | 280/707 |
| 4,624,476 | 11/1986 | Tanaka et al. | 280/707 |
| 4,696,489 | 9/1987 | Fujishiro et al. | 280/707 |
| 5,143,186 | 9/1992 | Lizell | 188/299 |
| 5,162,996 | 11/1992 | Matsumoto et al. | 364/424.05 |
| 5,163,702 | 11/1992 | Wood et al. | 280/707 X |
| 5,168,448 | 12/1992 | Matsumoto et al. | 364/424.05 |
| 5,174,598 | 12/1992 | Sato et al. | 280/707 |
| 5,189,614 | 2/1993 | Mitsuoka et al. | 364/424.05 |
| 5,203,584 | 4/1993 | Butsuen et al. | 280/707 |
| 5,228,719 | 7/1993 | Fukuyama et al. | 280/707 |

FOREIGN PATENT DOCUMENTS

| 3917716 | 12/1989 | Germany . |
| 4135526 | 4/1992 | Germany . |
| 60-248419 | 12/1985 | Japan . |

*Primary Examiner*—Karin L. Tyson
*Assistant Examiner*—Christopher P. Ellis
*Attorney, Agent, or Firm*—Keck, Mahin & Cate

[57] ABSTRACT

A vehicle suspension device includes a shock absorber disposed between a sprung portion and an unsprung portion of a vehicle for each of the vehicle wheels, a damping force changing device for changing a damping characteristic of the shock absorber, a detecting device for detecting a difference in a damping force among the shock absorbers for respective wheels, and a control device for controlling the damping characteristic of the shock absorber so as to restrict the difference in the damping force among the wheels when the vehicle is in a specific running condition. Through the use of such a vehicle suspension device, diagonal vibration can be suppressed, improved running stability can be obtained and riding comfort can be improved.

23 Claims, 20 Drawing Sheets

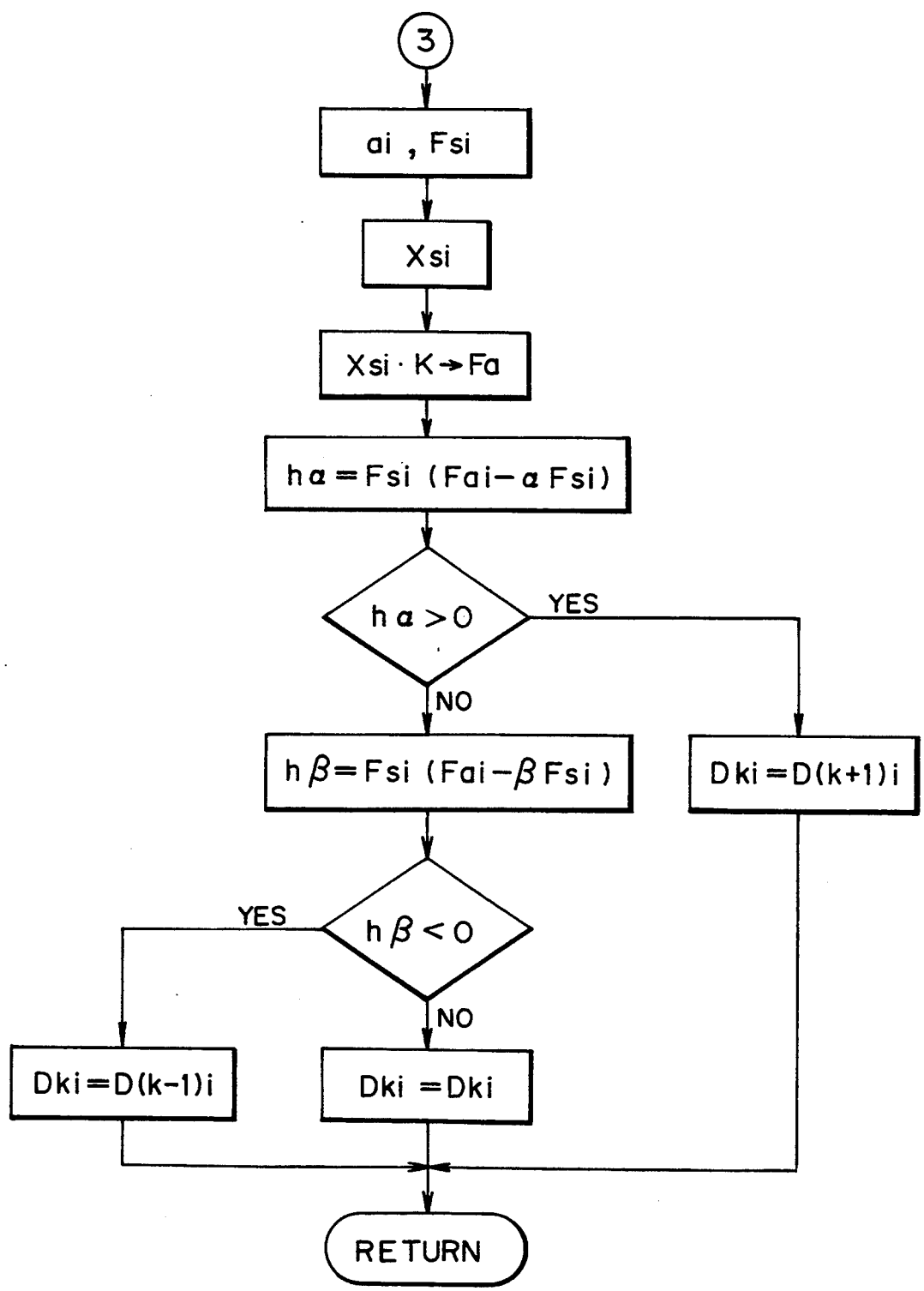

VEHICLE SUSPENSION DEVICE FOR STABILIZING STEERING CHARACTERISTICS

BACKGROUND OF THE INVENTION

1. Field of the Invention

The present invention relates to a vehicle suspension device having a shock absorber of which a damper characteristic is changeable.

2. Description of Related Art

Conventionally, a vehicle suspension device is generally provided with a shock absorber between a sprung portion of the vehicle or the vehicle body and an unsprung portion of the vehicle or the vehicle wheel for damping the vibration of vehicle wheel.

It has been known that the damping characteristic of the shock absorber is changeable, for example, between a hard and a soft, among a multiple steps, or continuously. In the conventional devices, the damping force of the shock absorber is changed so as to obtain a good riding comfort and running stability between the hard and soft damping characteristic.

Japanese Patent Public Disclosure No. 60-248419, laid open to the public in 1985, discloses a control in which the damping characteristic is controlled based on a relative speed and relative displacement of the sprung portion and the unsprung portion. When the directions of the relative displacement and speed of the sprung portion are the same as those of the unsprung portion, it is judged that the damping force of the shock absorber is acting in increasing the vibration. Otherwise, it is judged that damping force is acting in reducing the vibration of the wheel. In this type of suspension device, the damping force is controlled independently on each of the vehicle wheels. As a result, a big difference may occur among the shock absorbers, in the damping forces. This may cause an undesirable change in the steering characteristics of the vehicle or diagonal vibration.

SUMMARY OF THE INVENTION

It is therefore an object of the present invention to provide a vehicle suspension device which can prevent the steering system from producing an undesirable steering changes because of the suspension control.

It is another object of the present invention to provide a vehicle suspension device which can prevent the steering system from producing the diagonal vibration because of the suspension control.

The above and other objects of the present invention can be accomplished by a vehicle suspension device comprising damping changing means for changing a damping characteristic of a shock absorber, detecting means for detecting a difference in a damping force between the shock absorbers for right and left wheels, and control means for controlling the damping changing means to make the damping characteristic harder when the difference in the damping force exceeds a predetermined value.

According to another feature of the present invention, the control means causes the damping changing means to make the damping characteristic harder when the difference in the damping force between front and rear wheels exceeds a predetermined value.

In still another embodiment, the suspension device further comprises vertical movement detecting means for detecting vertical movement of the vehicle in a straight running condition and rolling detecting means for detecting a rolling movement component in a straight running condition. The control means causes the damping changing means to make the damping characteristic of a shock absorber having a softer characteristic harder when the rolling movement component is greater than the vertical movement component beyond a predetermined value.

In further embodiment, the suspension device further comprises vertical movement detecting means for detecting vertical movement of the vehicle in a straight running condition and pitching detecting a means for detecting pitching movement component in a straight running condition. The control means causes the damping changing means to make the damping characteristic of a shock absorber having a softer characteristic harder when the pitching movement component is greater than the vertical movement component beyond a predetermined value.

In a still a further embodiment, the suspension device further comprises threshold setting means for setting a threshold value of a sensibility for changing the damping characteristic of the shock absorber. The threshold setting means provides the threshold value with a value which makes a shock absorber having a softer damping characteristic of the right and left wheels harder when the difference in the damping force between the right and left wheels exceeds a predetermined value.

The threshold setting means provides the threshold value with a value which makes a shock absorber having a softer damping characteristic of the front and rear wheels harder when the difference in the damping force between the front and rear wheels exceeds a predetermined value.

Another feature of the present invention, is that the suspension device further comprises steering angle detecting means. The threshold setting means provides the threshold value with a value which makes a shock absorber having a softer damping characteristic of the right and left wheels harder when the rolling movement component is greater than the vertical movement component of the vehicle beyond a predetermined value.

The threshold setting means provides the threshold value with a value which makes a shock absorber having a softer damping characteristic of the front and rear wheels harder when the pitching movement component is greater than the vertical movement component of the vehicle beyond a predetermined value.

In a further embodiment of the present invention, the suspension device is provided with setting means for setting the predetermined value. The setting means sets the predetermined value at a relatively small value as the vehicle speed increases. In another aspect, the setting means reduces the predetermined value as the frictional coefficient between the wheel and road surface decreases.

Further, the vehicle suspension device may comprise frequency speculating means for speculating the frequency of vibration of the vehicle. The control means changes the predetermined allowance in accordance with the frequency. The frequency can be obtained based on a relationship between the displacement speed of sprung and unsprung portions of the vehicle and the frequency. The relationship is generally provided by experiment and the like previously.

In a preferred embodiment, the control means increases the predetermined allowance with regard to right and left wheels when the frequency is high. Alternatively, the control means decreases the predetermined allowance with regard to right and left wheels when the frequency is low.

In another embodiment, the control means greatly increases the predetermined allowance not to restrict change of the damping characteristic of the shock absorber when the frequency is high and controls the predetermined allowance to substantially zero so that the damping force of each of the shock absorbers of which damping characteristics are controlled acts in the same direction.

According to further aspect of the present invention, the control means controls the shock absorbers for respective wheels independently when the vehicle speed is lower than a predetermined value, and controls the shock absorbers for front wheels and rear wheels so that the damping forces of the shock absorbers for the front wheels act in the same direction as those for the rear wheels when the vehicle speed is greater than the predetermined value.

In further embodiment, the control means controls the shock absorbers for respective wheels independently when the vehicle speed is lower than a predetermined value, and controls the shock absorbers so that the damping force of each of the shock absorbers for the front wheels acts in the same direction when the vehicle speed is greater than the predetermined value.

When the damping force is always controlled for each of the wheels independently, the difference in the damping force among the respective wheels would be undesirably increased. As a result, a different steering characteristics would be produced between rightward and leftward steering so that the diagonal vibration is produced. According to one the preferred embodiment of the present invention, however, the damping characteristic of the softer one of the shock absorbers for the right and left wheels is made harder when the difference in the damping force between the right and left wheels exceeds the predetermined value. As a result, the diagonal vibration can be prevented to obtain an improved running stability. Likewise, in other embodiments of the present invention, the damping force is changed so as to get the running stability.

Further objects, features and advantages of the present invention will become apparent from the Detailed Description of Preferred Embodiments which follows when read in light of the accompanying Figures.

BRIEF DESCRIPTION OF THE DRAWINGS

FIG. 16 is a last portion of a flow chart of a control for changing the damping characteristic of the shock absorber for front wheels;

DETAILED DESCRIPTION OF THE PREFERRED EMBODIMENTS

Figure 1:
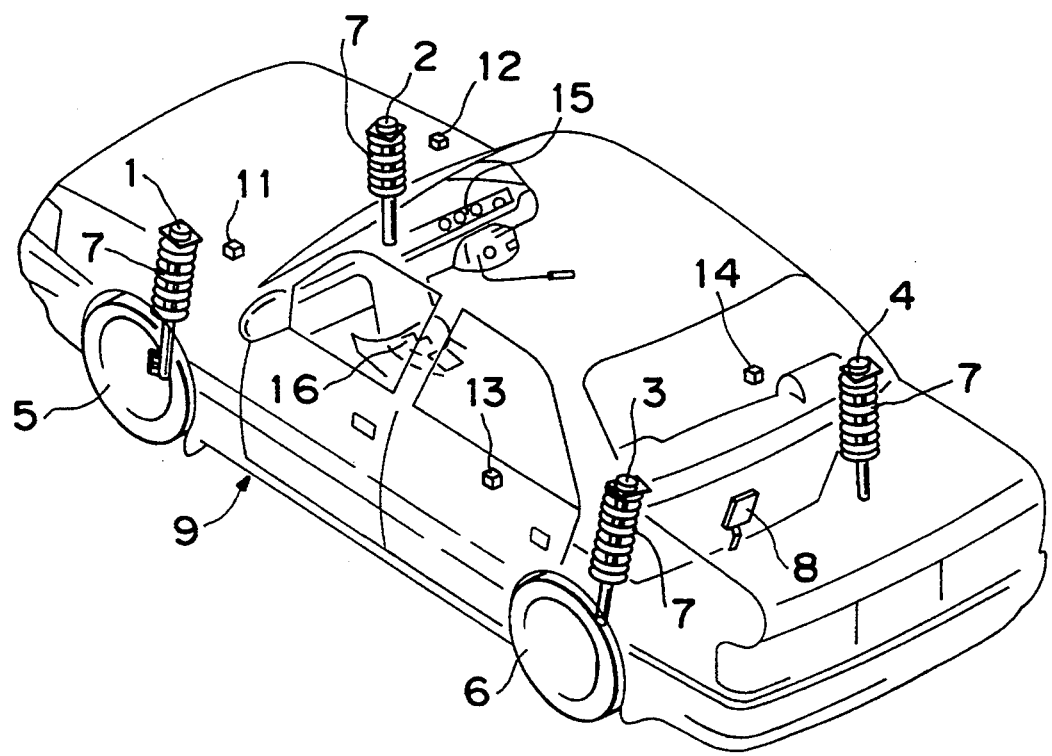
FIG. 1 is a perspective view of a vehicle to which the present invention can be applied.

FIG. 1 is a schematic perspective view of a vehicle 9 provided with a suspension device according to a preferred embodiment of the present invention.

In FIG. 1, a suspension device is provided for each of the vehicle wheels. The suspension devices are provided with shock absorbers 1, 2, 3, 4 respectively. The shock absorbers 1, 2, 3 and 4 can be changed, in 10 different stages in their damping characteristics by means of actuators (not shown). The shock absorbers 1, 2, 3 and 4 are also provided with pressure sensors for detecting hydraulic pressure sealed in the shock absorbers 1, 2, 3 and 4. Numeral 7 is a coil spring disposed around the shock absorber. Numeral 8 is a control unit for producing a control signal to the actuator so as to change the damping characteristic of the shock absorbers 1, 2, 3and 4.

The vehicle 9 is formed by a sprung portion or vehicle body portion and an unsprung portion or suspension and wheel portion. The sprung portion of the vehicle 9 is provided with acceleration sensors 11, 12, 13 and 14 for front left, front right, rear left and rear right wheels respectively. A vehicle speed sensor 15 for detecting the vehicle speed is provided in the instrument panel. Numeral 16 designates a mode select switch for switching the mode of the damping characteristic of the shock absorbers 1, 2, 3 and 4 among hard, soft and control mode in response to the driver's operation. When the hard mode is selected, a damping coefficient is set so as to provide the shock absorber with a hard damping characteristic. When the soft mode is selected, the damping coefficient is determined to provide a soft damping characteristic. When the control mode is selected, the damping characteristic is changed in accordance with a characteristic provided in a map or table which is stored in the control unit 8.

Figure 2:
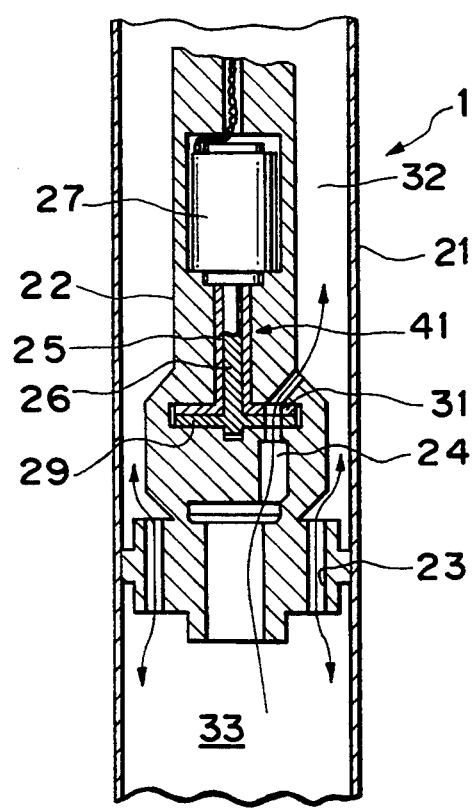
FIG. 2 is a sectional view showing an essential portion of a shock absorber.

FIG. 2 shows a sectional view of essential portions of the shock absorber 1. The shock absorber 1 is provided with cylinder 21 and piston unit 22 including a piston and piston rod combined integrally with the piston. The piston unit 22 is disposed in the cylinder 21 for reciprocal movement. The cylinder 21 is connected with the sprung portion of the vehicle whereas the piston unit 22 is connected with the unsprung portion of the vehicle. The piston unit 22 is formed with orifices 23 and 24. Orifices 23 are normally opened. The size of path of the other orifice 24 is changeable so as to provide ten different sizes.

Figure 3:
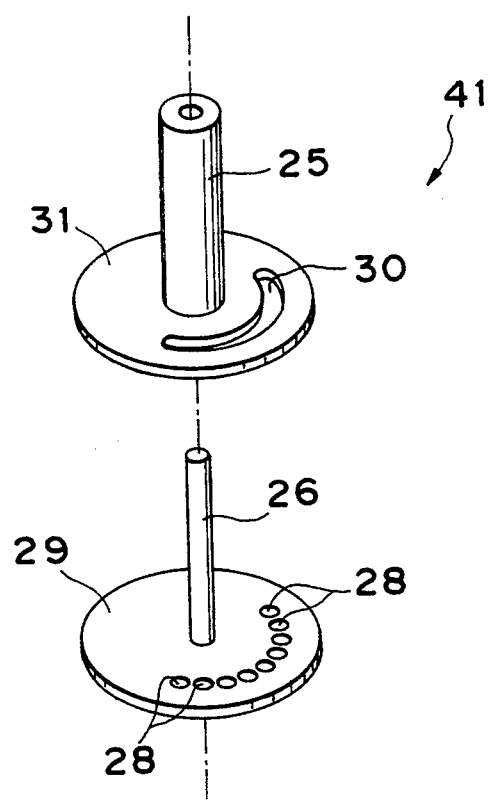
FIG. 3 is an explosive and perspective view of an actuator of the shock absorber.

FIG. 3 is a perspective view of actuator 41 of the shock absorber 1. Actuators 41, 42, 43 and 44 are provided for the shock absorbers 1, 2, 3 and 4 respectively. As shown in FIGS. 2 and 3, the actuator 41 is provided with a shaft 26 rotatably disposed in sleeve 25 which is fixed to the piston unit 22, a first orifice plate 29 which is mounted on a lower end of the shaft and formed with nine round openings 28 and a second orifice plate 31 which is mounted on the lower end of the sleeve 25 and formed with an elongated opening 30. As the shaft 26 is rotated, the elongated opening 30 is brought into communication with none through nine round openings 28.

An upper chamber 32 and lower chamber 33 are filled with fluid having a certain viscosity which can flow between the upper and lower chambers 32 and 33 through the orifices 23 and 24.

The other shock absorbers 2, 3 and 4 have the same structures as the shock absorber 1 and are provided with the actuators 42, 43 and 44.

Figure 4:
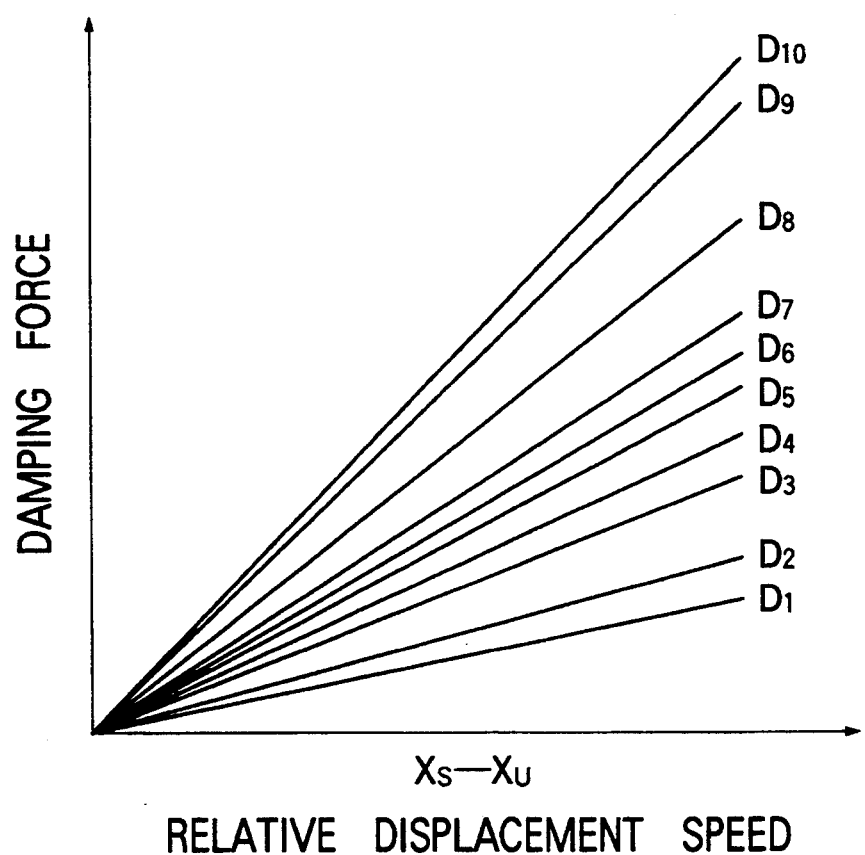
FIG. 4 is a graph showing a damping coefficient of the shock absorber.

FIG. 4 shows damping characteristics of the shock absorbers 1, 2, 3 and 4. References D1 and D10 are damping coefficients thereof. Damping force of the shock absorbers 1, 2, 3 and 4 is on the ordinate and on the abscissa is a relative displacement speed (Xs-Xu) of the sprung portion Xs to the unsprung portion Xu. Thus, the damping characteristics of the shock absorbers 1, 2, 3 and 4 can be changed by selecting one of the characteristics D1 through D10 in FIG. 4. In FIG. 4, the characteristic D1 is a softest one and characteristic D10 is a hardest one. The damping coefficient D1 can be obtained when the elongated opening 30 is brought into communication with all the round openings 28. On the other hand, when the elongated opening 30 is communicated with none of the round openings 28, the damping coefficient D10 can be obtained.

Figure 5:
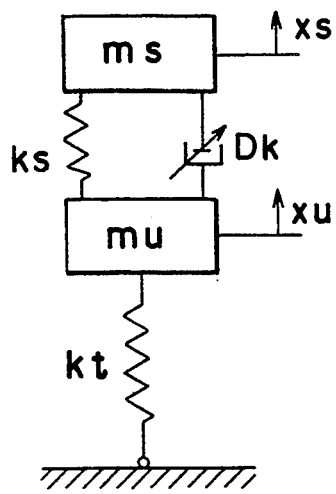
FIG. 5 is a view showing a simulation model of a vibration system of vehicle in accordance with the present invention.

FIG. 5 shows a simulated model of the vibration mechanism in accordance with the illustrated embodiment. In FIG. 5, references ms, mu, xs, xu, ks, kt and Dk are respectively a mass of the sprung portion, a mass of the unsprung portion, a displacement of the sprung portion, a displacement of the unsprung portion, a spring constant and a damping coefficient.

Figure 6:
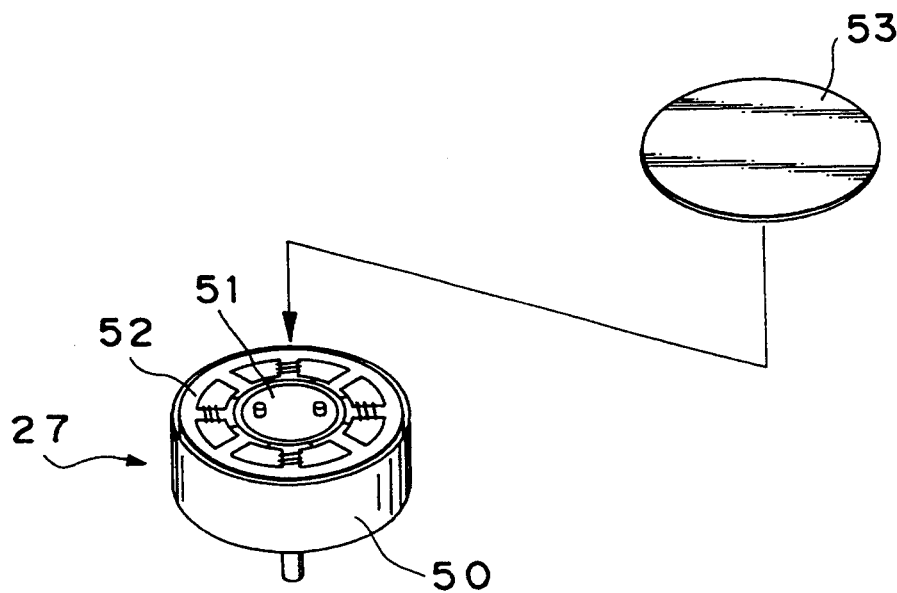
FIG. 6 is a schematic and perspective view of a step motor.
Figure 7:
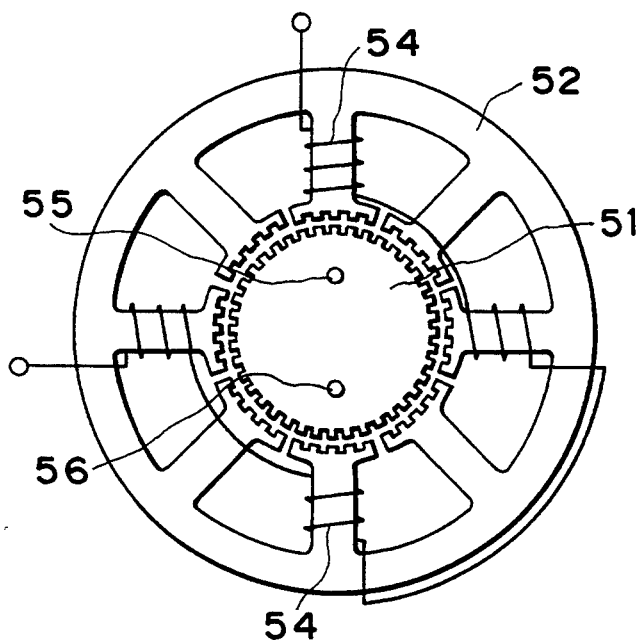
FIG. 7 is a schematic plan view of rotor and stator.

FIG. 6 is a schematic view of step motor 27 which is provided with cylinder 50, rotor 51 received in the cylinder 50, stator 52 and lid 53. FIG. 7 is a plan view of the rotor 51 and stator 52. The rotor 51 is formed with square teeth at the outer surface and stator 52 is formed with square teeth at an internal surface corresponding to the teeth of the rotor 51. Solenoid 54 covers the stator 52. The rotor is provided with a pair of pins 55, 56 functioning as stoppers,. The lid 53 is formed with a pair of grooves 57 and 58. The pin 55 is engaged with the groove 57 so as to restrict the rotatable amount of the rotor 51. The pin 56 is engaged with the groove 58. As a result, it facilitates positioning of the lid 53 on the rotor 51. For this purpose, the angular length of the groove 58 is greater than that of the groove 57. Thus, the rotational movement is always restricted by the groove 57. As the rotor 51 rotates in the clockwise direction in FIG. 8, the damping coefficient Dk is increased so that damping characteristic becomes harder. The counterclockwise rotation of the rotor 51 make the damping characteristics softer. When rotor 51 is rotationally advanced relative to the stator by one tooth, the damping coefficient Dk is changed by one. Thus, when the pin 55 is positioned at a first position (right end in FIG. 8), the damping coefficient Dk takes the value D10 which provides the hardest damping characteristic. On the other hand, when the pin 55 is located at a second position (left end in FIG. 8), the damping coefficient Dk takes the value of D1 which provides the softest characteristic.

Figure 9:
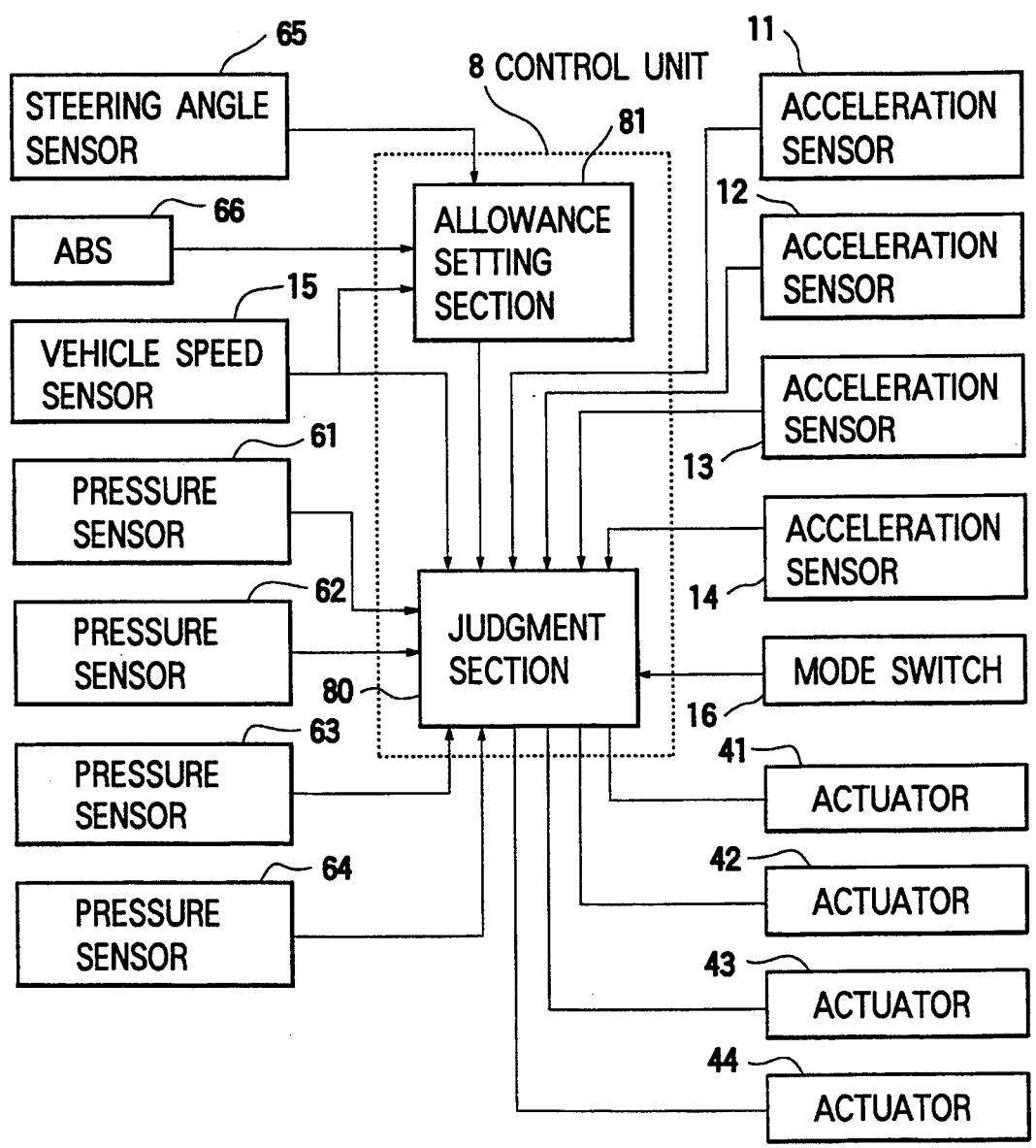
FIG. 9 is a block diagram of a control system for the suspension device in accordance with the present invention.

FIG. 9 is a block diagram of a control system of the vehicle suspension device in accordance with the present invention. Control unit 8 includes judgment section 80 and setting section 81. The judgment section 80 receives signals from pressure sensors .61, 62, 63 and 64 which sense a damping force Fsi of each of the wheels, acceleration sensors 11, 12, 13 and 14 which sense acceleration of the sprung portion ai and vehicle speed sensor 15 for sensing the vehicle speed V. The setting section 81 receives a signal signals from the vehicle speed sensor 15, steering angle sensor 65 for providing the steering angle $\theta$, and ABS system 66 for providing frictional coefficient $\mu$. The judgment section 80 calculates the damping coefficient Dki for determining the damping characteristics of the shock absorbers 1, 2, 3 and 4 and produces a control signal which is sent to the actuators 41, 42, 43 and 44 so as to control the damping characteristics for the shock absorbers 1, 2, 3 and 4. When a signal is received from the setting section 81, the judgment section 80 calculates the difference in the absolute value (Dkl-Dkr) (l, r: left and right shock absorbers 1, 3 and 2, 4) of the damping coefficient Dki. If the absolute value (Dkl-Dkr) is greater than a predetermined value t or allowance, the judgment section 80 produces the signal to one of the actuators 41, 42, 43 and 44 of the shock absorber having the softer damping force to make it harder from the value Dki to D(k+1)i. The setting section 81 calculates the allowance t based on the vehicle speed V, the steering angle $\theta$ and the frictional coefficient $\mu$ in light of the map or table stored therein. The damping force Fsi takes a continuous value. When it acts on the sprung portion upwardly, or when the sprung and unsprung portions are moved toward each other, it takes a positive value. On the contrary, when the sprung and unsprung portions are moved away from each other, it takes a negative value.

Figure 10:
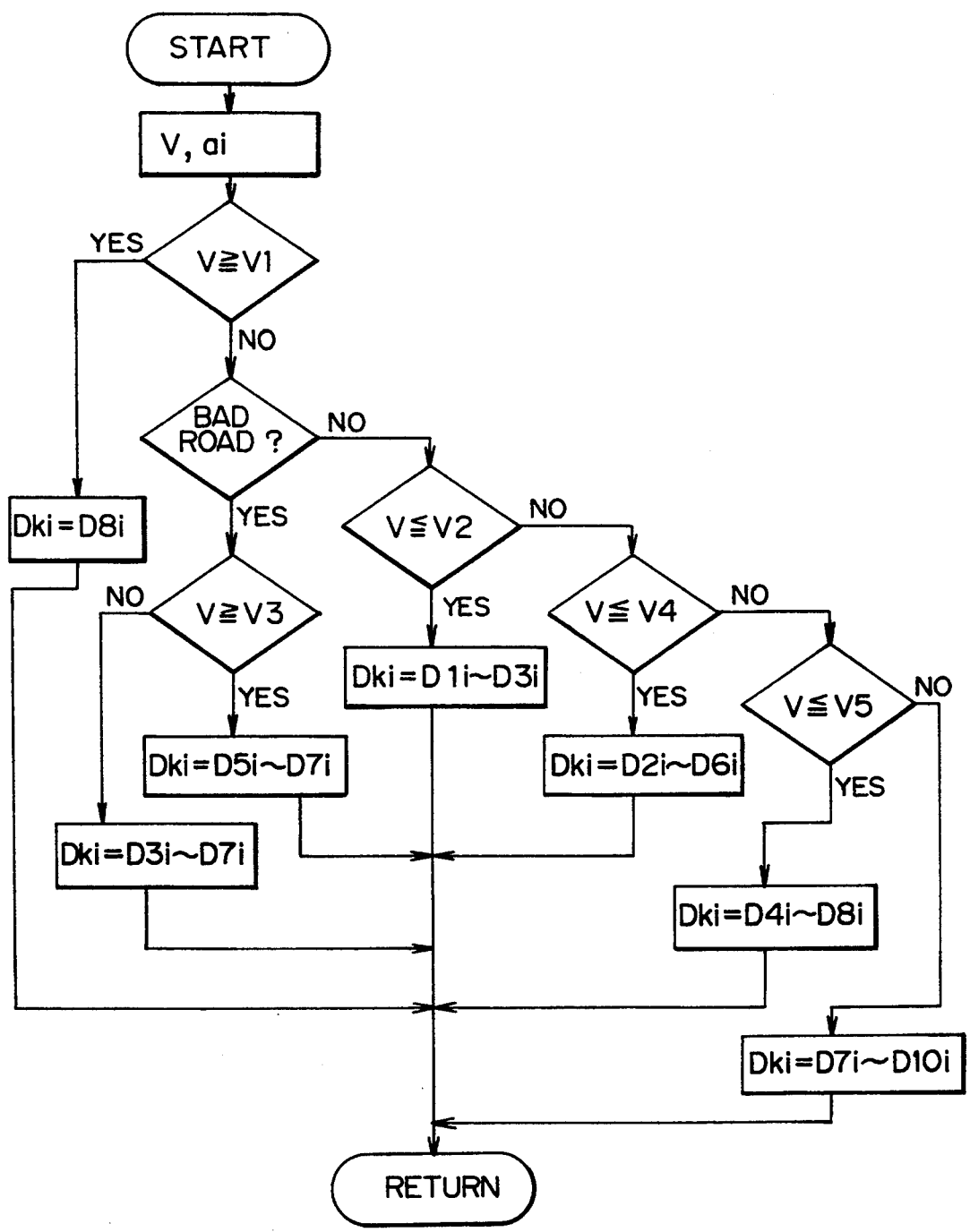
FIG. 10 is a flow chart for changing a damping coefficient in accordance with vehicle operating condition.

FIG. 10 shows a flow chart of a damping coefficient selecting control when the control mode is selected.

This control restricts the amount of the damping coefficient Dki so as not to produce undesirable vibration and delayed response because of excessive change of the damping coefficient.

In FIG. 10, the control unit 8 receives the vehicle speed V and acceleration ai. Then, the control unit 8 judges whether or not the vehicle speed is not more than a first predetermined value V1 (3 km). If the vehicle speed is not greater than the first predetermined value V1, the control unit 8 provides the damping coefficient Dki with the value D8i to make it harder in order to prevent squat and brake dive. On the other hand, when the vehicle speed exceeds V1, the control unit 8 judges whether or not a road condition on which the vehicle runs is bad or the road is rough based on the change of the acceleration ai within a predetermined time period.

When the road condition is bad, the control unit 8 further judges whether or not the vehicle speed exceeds a third predetermined value V3 (for example 50 km). If the vehicle speed is greater than the third value V3, the control unit 8 provides the damping coefficient Dki with a value from D5i to D7i which provides a relatively hard characteristic of the shock absorber.

When the vehicle is judged as running in a good road condition or the vehicle is Judged to run on a smooth road, the control unit 8 judges whether or not the vehicle speed V is not greater than a second predetermined value V2 (for example 30 km). If the speed V is not greater than a second predetermined vehicle speed V2, the control unit 8 changes the damping coefficient Dki to the range D1i to D3i so as to provide a relatively soft damping characteristics. This improves the riding comfort.

If it is judged that the vehicle speed V is greater than the second value V2, the control unit 8 further judges whether or not the vehicle speed V is greater than a fourth predetermined value V4 (for example 60 km). If the vehicle speed is not greater than the fourth value V4, the control unit 8 controls the damping coefficient Dki within a value from D2i to D6i so as to change the damping characteristics in a relatively broad range from soft to hard. This improves both the riding comfort and the running stability.

On the other hand, if it is judged that the vehicle speed exceeds the predetermined vehicle speed V4, the control unit further judges whether or not the vehicle speed is not greater than a fifth predetermined value (for example 80 Km). As a result, when the vehicle speed is not greater than the fifth value and it is in a usual speed condition, the control unit 8 controls the damping coefficient Dki in a value from D4i to D8i so as to make the damping characteristic hard. Thus, both the riding comfort and the running stability can be improved.

When the vehicle speed is greater than the fifth value V5 or when the vehicle is in a high speed condition, the control unit 8 controls the damping coefficient Dki in a range from D7i to D10i so as to provide the damping characteristic with a hard one. This improves the running stability.

Figure 11:
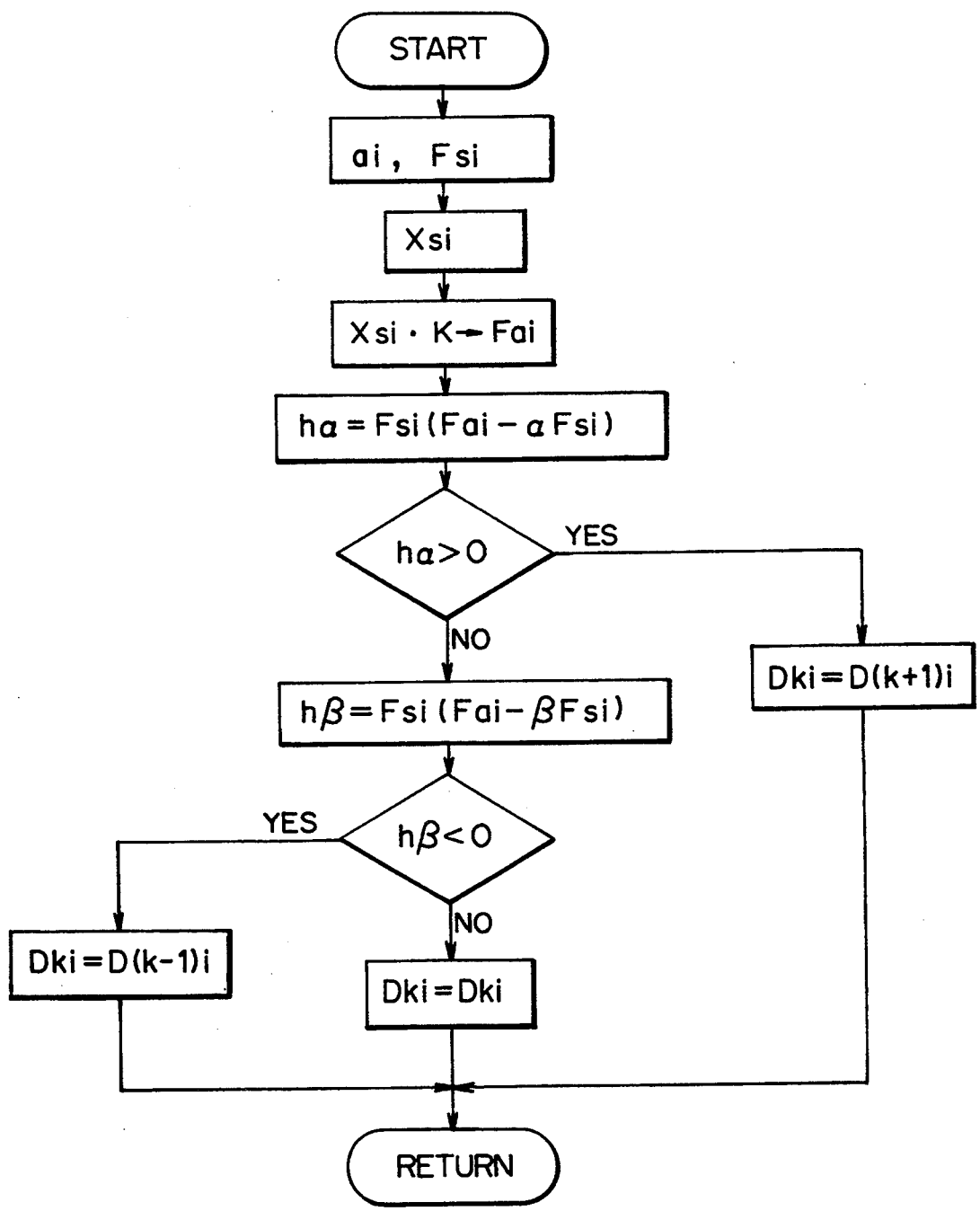
FIG. 11 is a flow chart of a basic control for changing the damping characteristic.

FIG. 11 shows a basic flow chart of a damping characteristic change control for the shock absorbers 1, 2, 3 and 4 when the control mode is selected.

The control unit 8 receives signals of acceleration ai from the acceleration sensors 11, 12, 13 and 14, damping force Fsi from the pressure sensors 61, 62, 63 and 64, vehicle speed V from the vehicle speed sensor 15, frictional coefficient $\mu$ from ABS (anti skid braking control system). Then, the control unit 8 calculates the displacement speed of the sprung portion Xsi by integrating the vertical acceleration ai. The control unit 8, next, calculates ideal damping force Fai by multiplying the displacement speed Xsi by a constant K(K<0). Then the control unit 8 calculates a parameter h$\alpha$ (h$\alpha$=Fsi (Fai−$\alpha$Fsi) . . . (1). The control unit 8 judges whether or not the value of the parameter h$\alpha$ is positive or not.

Figure 8:
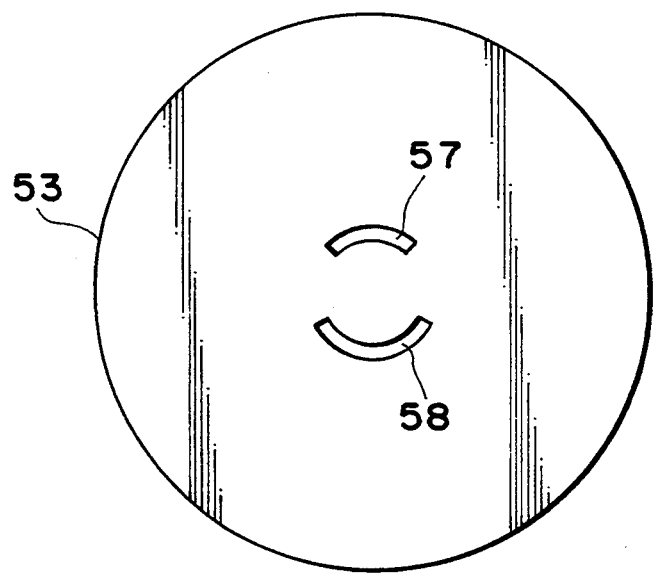
FIG. 8 is a view showing a bottom surface of the lid.

As a result, if the parameter h$\alpha$ is positive, the control unit 8 advances the step motor 27 by one step in the clockwise direction in FIG. 8 so as to make the damping coefficient Dki advance to the value D(k+1)i. That is, the control unit 8 changes the damping characteristic to a harder one by one step. When the parameter h$\alpha$ is negative, the control unit 8 further calculates another parameter h$\beta$ based on a formula (h$\beta$=Fsi (Fai−$\beta$Fsi)) . . . (2). If the value h$\beta$ is not negative value, the control unit 8 holds the value Dki and goes to next proceeding cycle. When the value h$\beta$ is negative, the control unit 8 rotates the step motor 27 by one step in the counterclockwise direction to get a damping coefficient D(k−1) which provides a softer damping characteristic than the value Dki by one step. The values $\alpha$ and $\beta$ are threshold values for preventing noise vibration in the change of the damping coefficient. The value $\alpha$ takes a value greater than 1 but the value $\beta$ takes a value smaller than 1 and greater than 0. As a result, the value h$\alpha$ normally takes a negative value and the value $\beta$ takes a positive value so as to suppress the change of the value Dki. If the actual damping force Fsi and the ideal or skyhook damping force take values of the same sign, both the values h$\alpha$ and h$\beta$ are negative. In this case, the damping coefficient Dki is changed to a value D(k−1)i which provides a softer damping characteristic than the value Dki.

Figure 12:
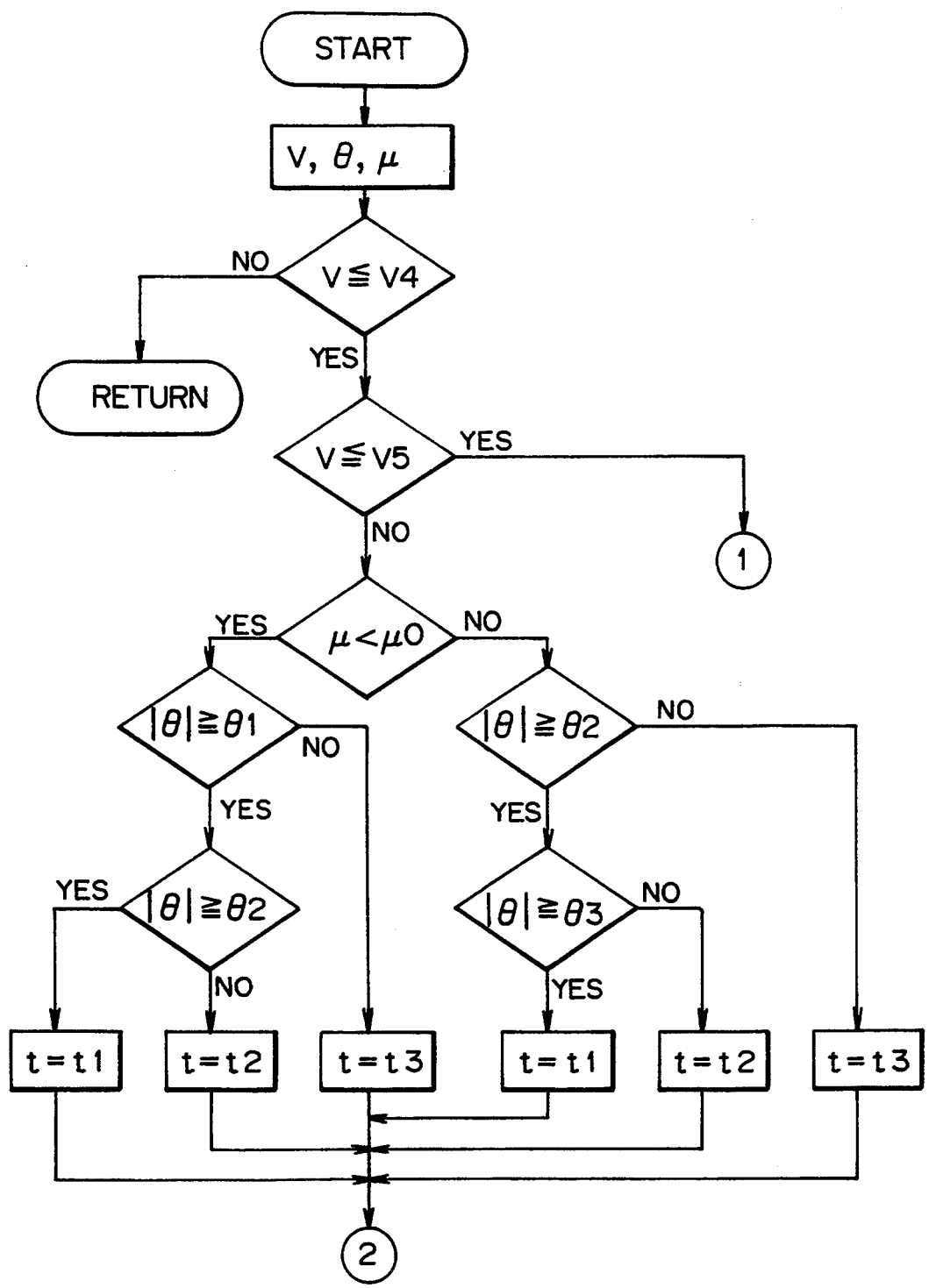
FIG. 12 is a first portion of a flow chart of a control for changing the damping characteristic of the shock absorber for front wheels.
Figure 13:
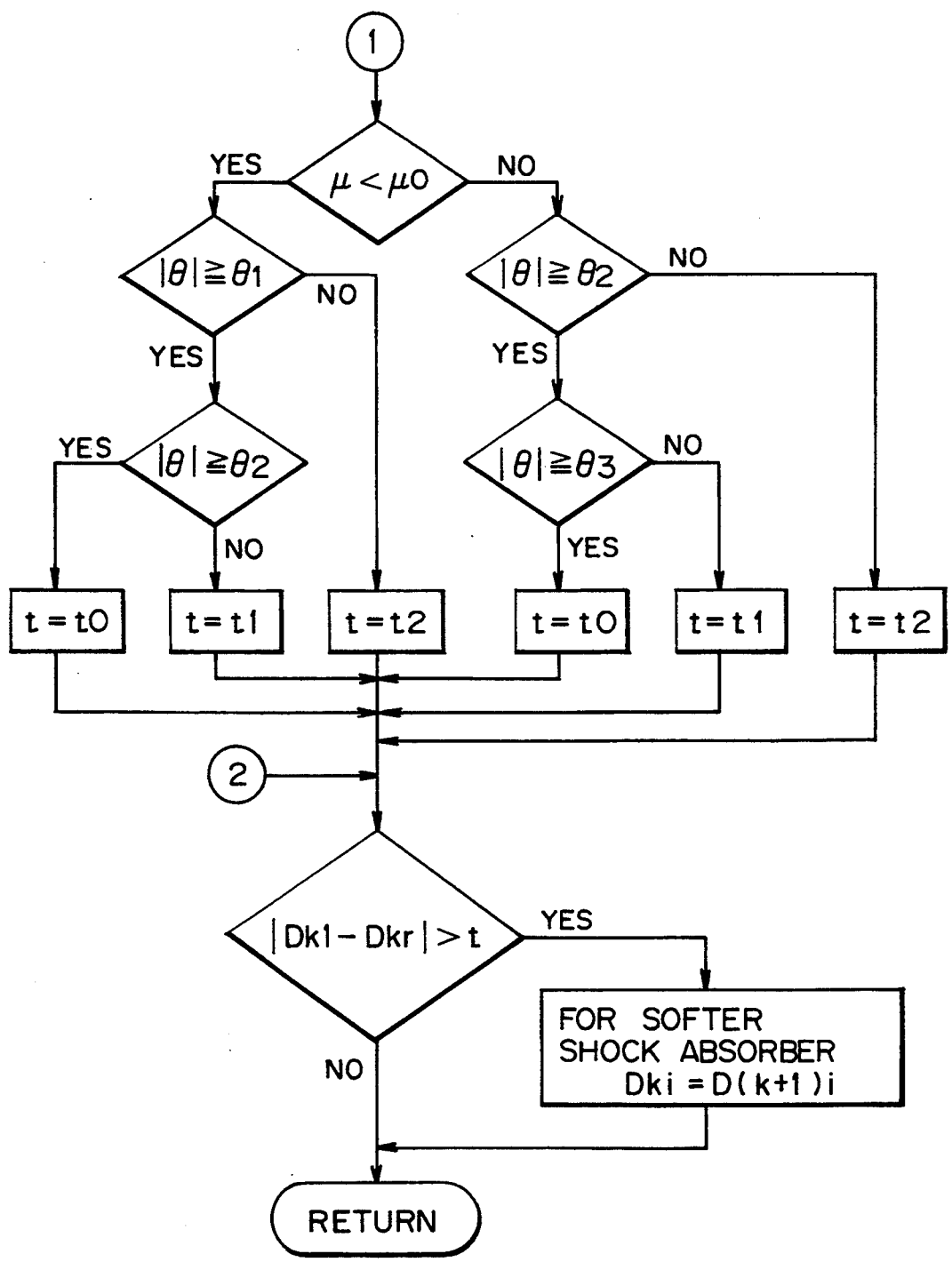
FIG. 13 is a last portion of a flow chart of a control for changing the damping characteristic of the shock absorber for front wheels.

FIGS. 12 and 13 show flow charts of a control for changing the damping characteristic so as to prevent the diagonal vibration when the control mode is selected. The setting section 81 receives the vehicle speed V from the vehicle speed sensor 15, the steering angle $\theta$ from the steering angle sensor 65 and the frictional coefficient $\mu$ from the ABS. The setting section 81 judges whether or not the vehicle speed is not greater than the fourth speed V4. If the vehicle speed is not greater than the fourth speed V4, the setting section 81 holds the damping coefficient Dki at its present value. This is because there is no fear of the diagonal vibration in such a low speed condition.

On the contrary, when the judgment is No and the vehicle speed is greater than usual, the control unit 8 judges whether or not the vehicle speed is not greater than the fifth speed V5. If the vehicle speed is not greater than the fifth speed V5, the control unit 8 judges whether or not the frictional coefficient $\mu$ is not greater than a predetermined value $\mu$0. If this judgment is Yes and the frictional coefficient $\mu$ is not greater than a predetermined value $\mu$0, the control unit 8 then judges whether or not the steering angle $\theta$ is not smaller than a first predetermined value $\theta$1 for evaluation of the cornering force acting on the vehicle which influences the running stability of the vehicle.

If the steering angle $\theta$ is greater than the first value $\theta$1, then, the control unit 8 judges whether or not the steering angle $\theta$ is greater than a second predetermined value $\theta$2. If this judgment is Yes and the steering angle $\theta$ is greater than the second value $\theta$2, the setting section 81 provide the allowance t for the difference in the damping force between the wheels with a value t1, for example 1, and produces the signal t1 to the judgment section 80. This is because the vehicle tends to produce undesirable horizontal movement under this condition of a greater steering angle and smaller frictional coefficient. If the judgment is No and the steering angle $\theta$ is not so great, the setting section 80 provides the allowance t with a relatively greater value t2, for example 2, and produces the signal t2 to the judgment section 80.

On the other hand, when the steering angle $\theta$ is less than the first angle $\theta1$, the setting section 81 provides the allowance t with a great value t3, such as 3, and produces the signal t3 to the judgment section 80.

When the frictional coefficient $\mu$ is greater than the value $\mu0$, the control unit 8 further judges whether or not the value $\theta$ is greater than the second value $\theta2$. If the value $\theta$ is not greater than the second value $\theta2$, the allowance is set at the value t3. If the judgment is Yes and the value $\theta$ is greater than the second value $\theta2$, then it is Judges whether or not the absolute value of the steering angle $\theta$ is greater than a third predetermined value $\theta3$. If the judgment is Yes and the steering angle $\theta$ is greater than the third predetermined value $\theta3$, the allowance is set at t1 because the steering characteristic tends to be changed to produce the diagonal vibration. If the judgment is No and the steering angle $\theta$ is not greater than the third predetermined value $\theta3$, the allowance is set at the value t2 which is introduced to the judgment section 80.

If the vehicle speed exceeds the fifth value V5 wherein the vehicle is in a high speed condition, the setting section 81 provides the allowance t with a smaller value when the vehicle is in the usual speed condition.

The judgment section 80 judges whether or not the absolute value of the difference (Dkl-Dkr) is greater than the allowance t set by the setting section 81. If the judgment is Yes and the absolute value of the difference (Dkl-Dkr) is greater than the allowance t, the control unit 8 rotates the step motor 27 by one step to advance the damping coefficient Dki to a value D(k+1)i and thus make the shock absorber with the softer damping characteristic harder. If the judgment is No and the absolute value of the difference (Dkl-Dkr) is not greater than the allowance t, the judgment section 80 produces no signal so that the same value Dki is maintained.

As aforementioned, when the difference in the damping coefficient (Dkl-Dkr) of the shock absorbers for the right and left wheels exceeds the allowance t and thus the vehicle has a tendency of producing the diagonal vibration, the control unit rotates the step motor of the shock absorber having a softer damping characteristic in the clockwise direction in FIG. 8 and change the damping coefficient from the present value Dki to a value D(k+1) so as to make the damping characteristic harder. As a result, the difference (Dkl-Dkr) is reduced to prevent the diagonal vibration. In addition, according to the above embodiment, the allowance is reduced as the possibility toward the diagonal vibration is increased because of change in the steering, speeding and road conditions. Thus, running stability can be obtained irrespective of the running conditions of the vehicle.

Figure 14:
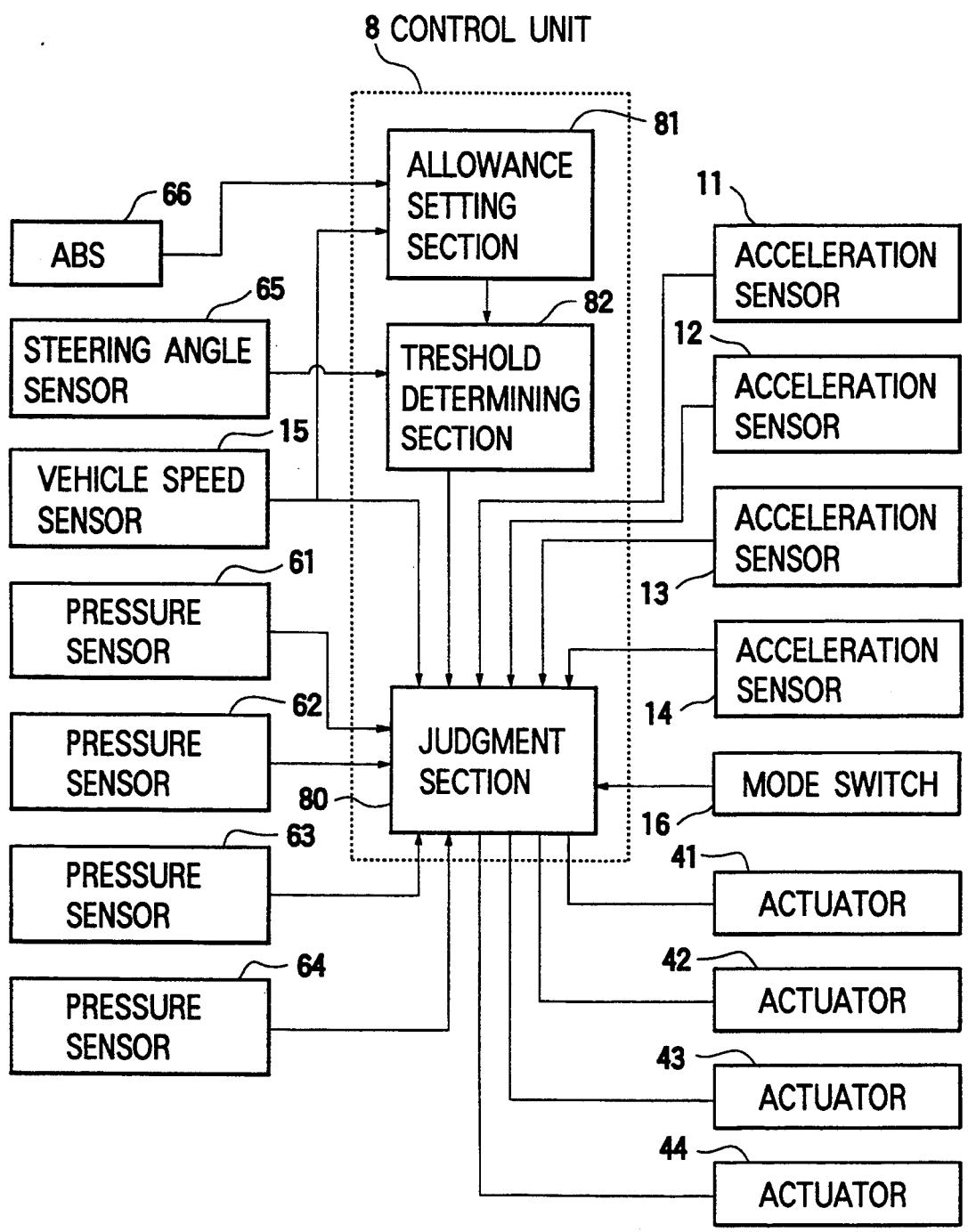
FIG. 14 is a block diagram of a control system for the suspension device in accordance with another embodiment of the present invention.

FIG. 14 shows a block diagram in accordance with another preferred embodiment of the present invention.

The control unit 8 is provided with a threshold determining section 82 in addition to the setting and judgment sections 81, 80. The threshold determining section 82 receives the steering angle $\theta$ and the signal from the setting section 81 and produces a threshold signal to the judgment section 80.

Figure 15:
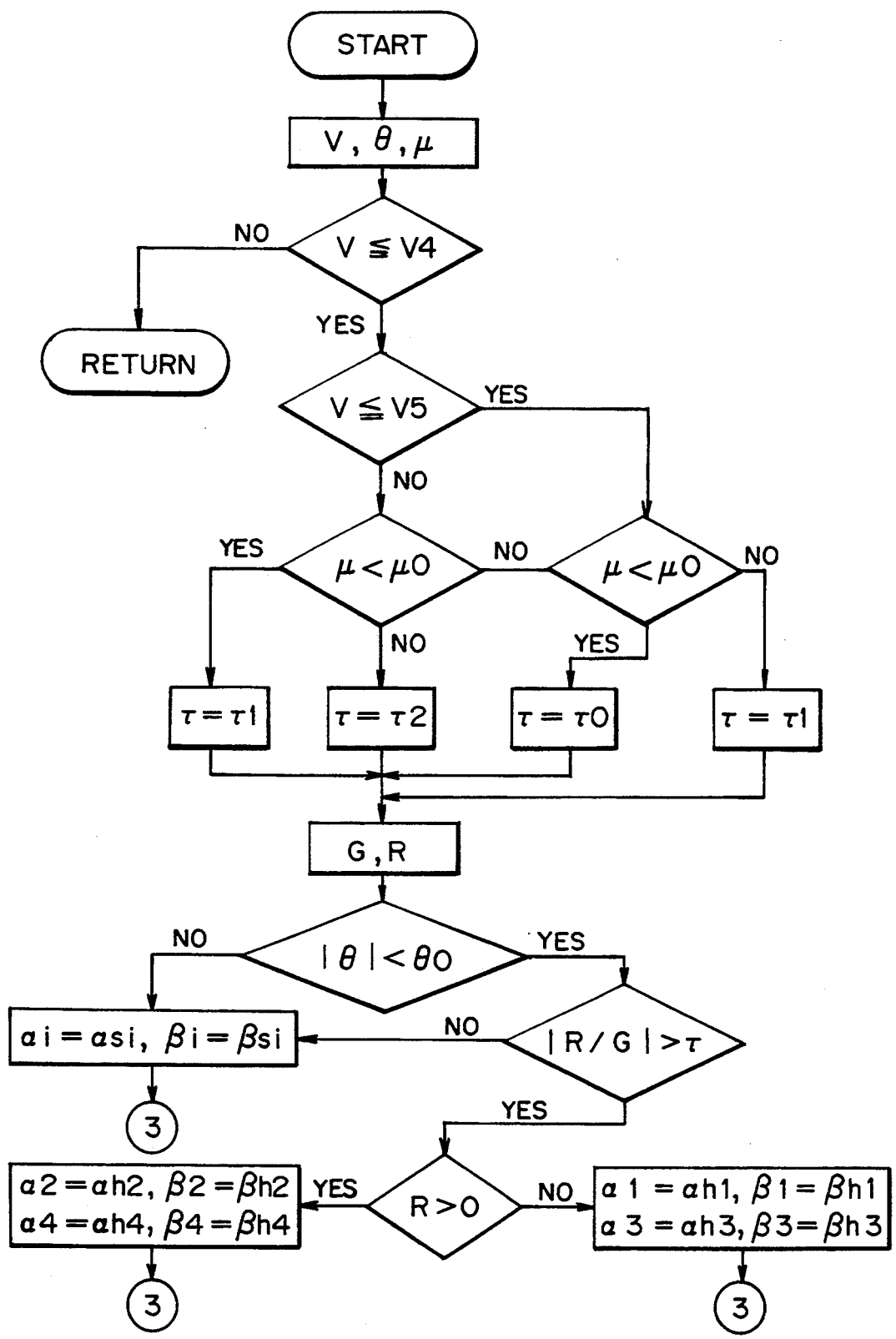
FIG. 15 is a first portion of a flow chart of a control for changing the damping characteristic of the shock absorber for front wheels.

FIGS. 15 and 16 show flow charts of a control for changing the damping characteristic when the control mode is selected. The damping coefficient Dki can be controlled within the range selected by means of the procedure of FIG. 10 as well as the former embodiment.

When the vehicle speed V is not greater than the value V4, the allowance signal is not produced. When the vehicle speed is greater than the value V4 and smaller than the value V5 and when the frictional coefficient $\mu$ is not greater than the value $\mu0$, allowance $\tau$ is set at a value $\tau1$. If the frictional coefficient $\mu$ is greater than the value $\mu0$, the allowance $\tau$ is set at a value $\tau2$ which is greater than the value $\tau0$. The value $\tau2$ is introduced to the judgment section 80.

If the vehicle speed V exceeds the value V5, it is judged whether or not the frictional coefficient $\mu$ is not greater than the value $\mu0$. If the frictional coefficient $\mu$ is not greater than the value $\mu0$, the allowance $\tau$ is set at a value $\tau0$ which is smaller than the value $\tau1$. On the other hand, if the frictional coefficient $\mu$ is greater than the value $\mu0$, the allowance is set at the value $\tau1$, which is introduced into the determining section 82.

When the signal from the setting section 81 is introduced, the determining section 82 calculates a vertical movement component G and rolling movement component of the vehicle movement R based on the acceleration ai detected by the respective acceleration sensors 11, 12, 13 and 14 for the respective wheels. The values G and R are obtained by the following formulas.

$$G = (a1 + a2 + a3 + a4) \ldots \quad (3)$$

$$R = (a1 + a3)/2 - (a2 + a4)/2 \ldots \quad (4)$$

Then the control unit 8 judges whether or not the steering angle $\theta$ is not greater than a predetermined value $\theta0$ and thus the vehicle is in a substantially straight running condition. If the Judgment is Yes and the vehicle is in a substantial straight running condition, the determining section 82 judges whether or not the absolute value of a value R/G is greater than the allowance $\tau$.

On the other hand, when the steering angle $\theta$ is greater than the value $\theta0$ and the vehicle is considered to be in a cornering or steering condition, the determining section 82 provides threshold values $\alpha$ and $\beta$ with values $\alpha$si and $\beta$si which are introduced to the judgment section 80. Likewise, the value R/G is not greater than the value $\tau$, the determining section 82 provides threshold values $\alpha$ and $\beta$ with values $\alpha$si and $\beta$si which are introduced to the judgment section 80.

If the value R/G is greater than the value $\tau$, it is further judged whether or not the value R is positive. If the judgment is Yes and the value R is positive, the determining section 82 provides threshold values $\alpha2$ and $\beta2$, $\alpha4$ and $\beta4$ with values $\alpha$h2 and $\beta$h2, $\alpha$h4 and $\beta$h4 which are introduced to the judgment section 80. The threshold values $\alpha2$ and $\beta2$, $\alpha4$ and $\beta4$ are provided for changing the sensitivity of damping coefficient control of the left shock absorbers 2 and 4.

If the value R is negative, the determining section 82 provides threshold values $\alpha1$ and $\beta1$, $\alpha3$ and $\beta3$ with values $\alpha$h1 and $\beta$h1, $\alpha$h3 and $\beta$h3 which are introduced to the judgment section 80. The threshold values $\alpha1$ and $\beta1$, $\alpha3$ and $\beta3$ are provided for changing the sensitivity of damping coefficient control of the left shock absorbers 1 and 3.

Figure 17A:
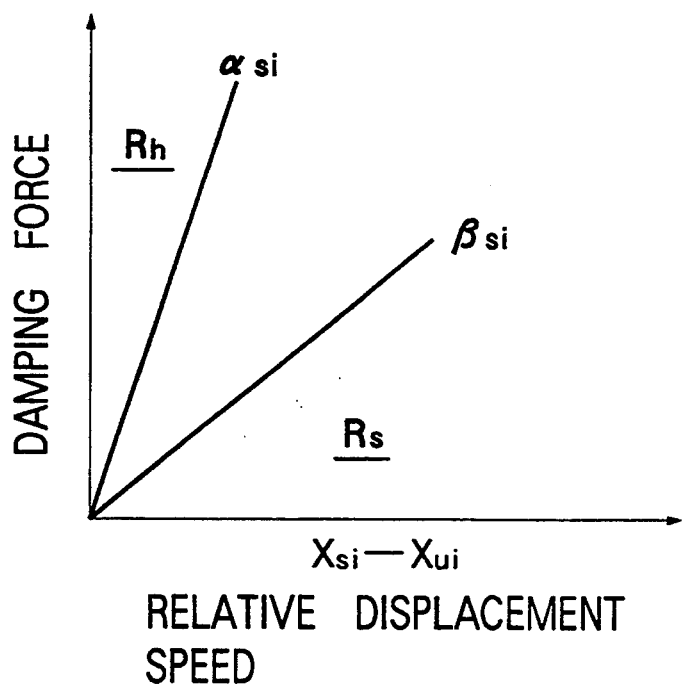
FIGS. 17a and 17b are graphical representations showing relationships between damping force, relative displacement speed of the sprung portion to the unsprung portion and the threshold values $\alpha$ and $\beta$.
Figure 17B:
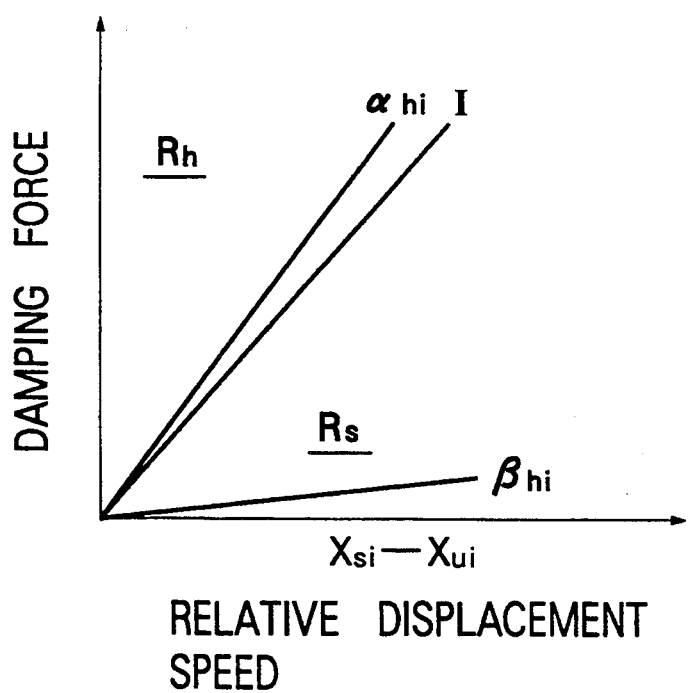

FIG. 17 is a graphical representation showing a relationship of the damping force, the relative displacement speed (Xsi-Xui) of the sprung portion and the unsprung portion and the threshold values αi and βi. In FIGS. 17(a) and (b), in zone Rh, the damping coefficient is changed from a value Dki to D(k+1)i to provide a harder damping characteristic and in zone Rs, the damping coefficient is changed from a value Dki to D(k−1)i to provide a softer damping characteristic. A zone between the values αhi and βhi, αsi and βsi shows a zone where there is no change in the damping coefficient or dead zone. Comparing FIG. 17(a) with FIG. 17(b), it is seen that the gradient of lines αhi and βhi are smaller than those of αsi and βsi. Thus, the values αsi and βsi are greater than the values αhi and βhi in the zone Rs. The values αhi and βhi are greater than the values αsi and βsi in the zone Rh. This means that it is more difficult to make the damping characteristic softer than make it harder if the threshold value αhi and βhi are set as the threshold values αi and βi.

Normally, the threshold values αi and βi are set at the values αsi and βsi. The signal denoting the threshold values αi and βi are introduced to the judgment section 80.

The judgment section 80 controls the damping coefficient Dki.

According to the illustrated embodiment, when the ratio of the rolling movement component R of the vehicle to the vertical movement of the vehicle is greater than the allowance τ, the threshold values αi and βi are set so that the damping characteristic is readily changed to a harder one and hardly to a softer one based on the sign of the rolling movement component R. As a result, this prevents the steering characteristic from producing the diagonal vibration even when a greater steering operation is made.

In still another preferred embodiment, when the difference in the damping coefficient (DkF−DkR) (F: shock absorbers 1, 2(for front wheels), R: shock absorbers 3, 4 (for rear wheels)) is greater than allowance T determined based on the vehicle speed V, the frictional coefficient μ and the steering angle θ, the damping coefficient Dki of a shock absorber having a softer damping characteristic is changed to a harder one D(k+1)i. In controlling the damping coefficient Dki, a pitching movement component P can be employed. In this case, the value P is provided by the following formula.

$$P=(a1+a2)/2-(a3+a4)/2 \ldots \quad (5)$$

When the value P/G is greater than allowance τL which is obtained based on the vehicle speed V and the frictional coefficient μ, the sign of the value P is judged. The threshold values αi and βi are set in the same manner as the former embodiment so that change toward hard is easy whereas change toward soft is not easy.

In another preferred embodiment, in calculating the rolling movement component, a rolling movement component R1 for the front portion of the vehicle and a rolling movement component R2 for the rear portion may be independently calculated wherein the values R1, R2 are provided by R1=a1−a2 and R2=a3−a4. Then, the threshold values αi and βi are determined based on a result of a comparison of values of ratios R1/G and R2/G with allowance τR and sign of R1 and R2. Alternatively, when the pitching movement component and the vertical movement element is greater than allowance τD, a control can be made so as to change the damping coefficient Dki.

In changing the damping coefficient, value Dki can be changed by greater steps to values such as D(k+2)i or D(k−2)i. In the illustrated embodiment, the pins 55, 56 are formed on the rotor 51. However, the pins 55, 56 may be provided on the lid 53 and grooves 57, 58 may be provided on the rotor 51 instead. Alternatively, rotor 51 may be provided with pin and groove which are respectively engaged with groove and pin formed on the lid 53. Although the step motor 27 is utilized in the illustrated embodiment, a DC motor can be employed and controlled by feedback control to provide a target damping characteristic of the shock absorbers 1, 2, 3 and 4.

Hereinafter, there will be described still another embodiment of the present invention.

Figure 18:
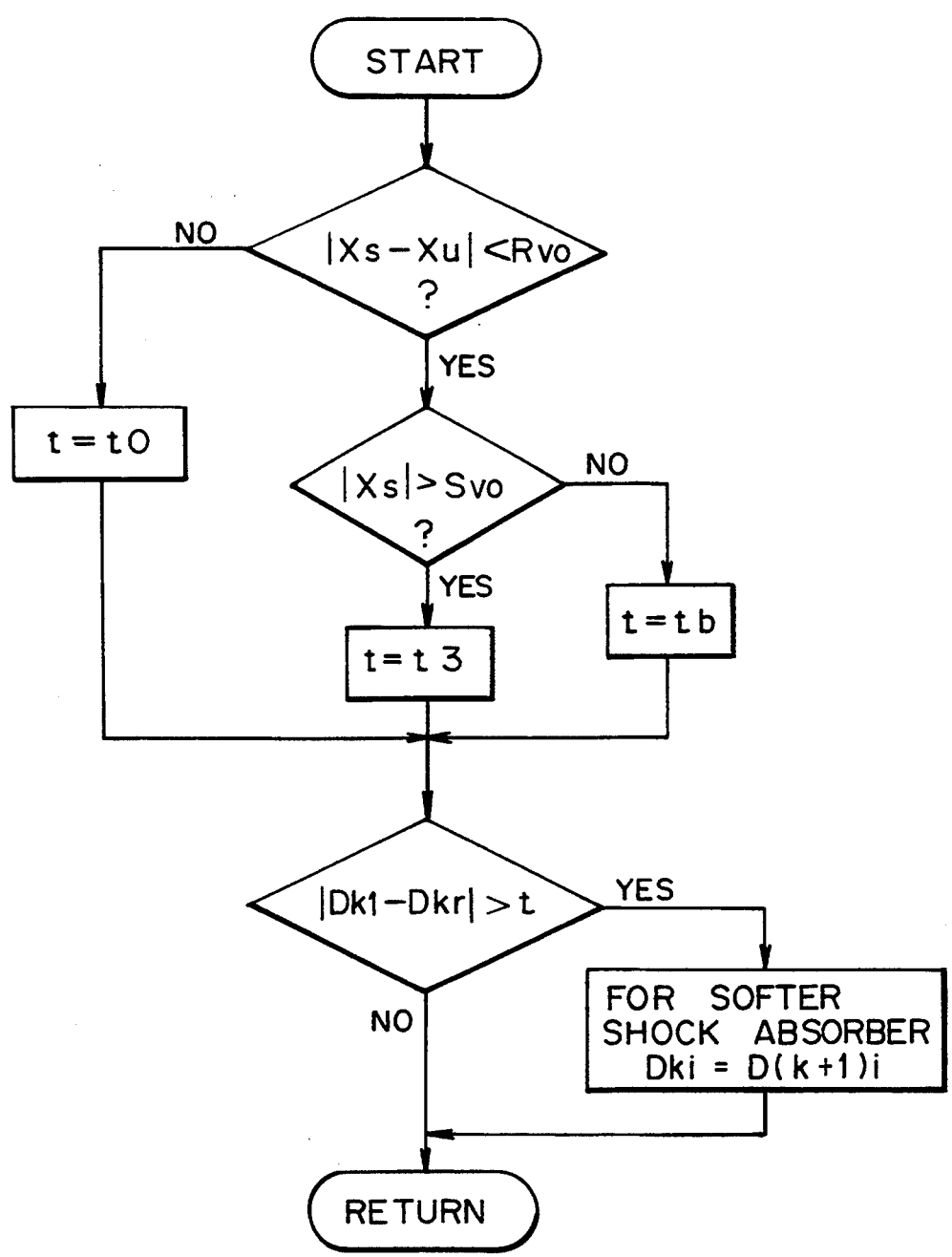
FIG. 18 is a flow chart of a control for changing the damping characteristic of the shock absorber in accordance with a still another embodiment.
Figure 19:
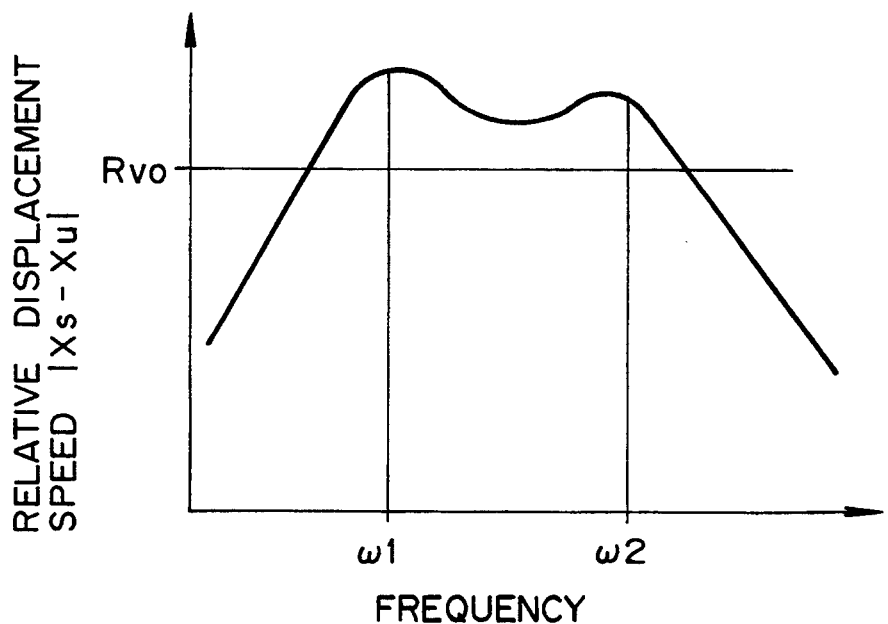
FIG. 19 is a graphical representation showing a relationship between the relative displacement speed and vibration frequency of the vehicle.
Figure 20:
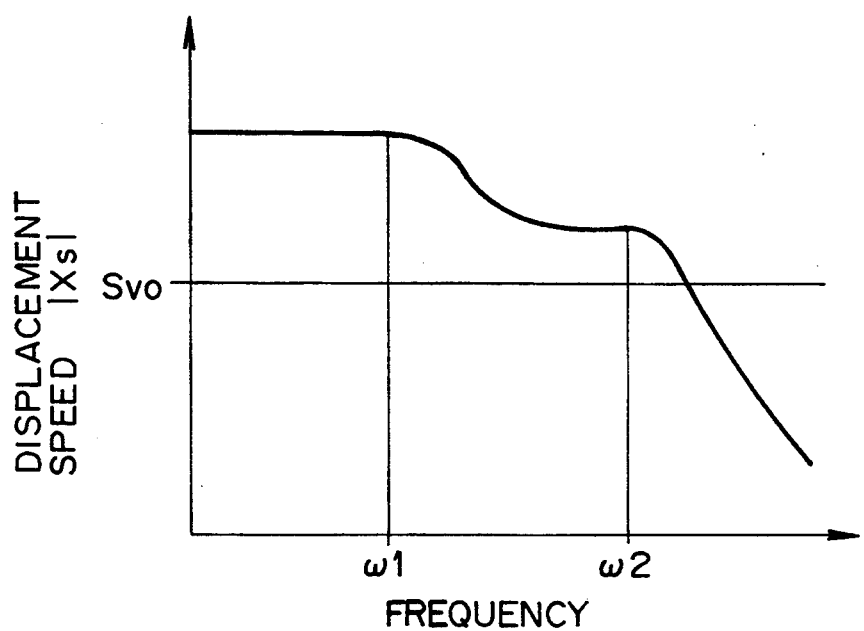
FIG. 20 is a graphical representation showing a relationship between the displacement speed of the sprung portion and vibration frequency of the vehicle.

Referring to FIG. 18, there is shown a flow chart of a control for changing the damping characteristic of the shock absorbers 1, 2, 3 and 4 when the control mode is selected. FIGS. 19 and 20 show a relationship between the relative displacement speed (Xs−Xu) between the sprung and unsprung portions and vibration frequency produced in the vehicle, and a relationship between a displacement speed of the sprung portion and the vibration frequency. These relationships are provided previously by experiment or by experience and stored in the control unit 8 as a map or table.

In the illustrated embodiment, vibration frequency is speculated based on the maps as embodied in FIGS. 19 and 20. The allowance t for changing the damping coefficient is set based on the speculated frequency.

In FIG. 18, the control unit 8 judges whether or not the absolute value of the relative displacement speed (Xs−Xu) is smaller than a predetermined value Rv0. If the judgment is Yes and the value (Xs−Xu) is smaller than the value Rv0, the control unit 8 judges that the experienced vibration is not within a frequency zone in which resonance frequencies of the sprung and unsprung portions w1 and w2 are included. In this case, the control unit 8 further judges whether or not the absolute value of the displacement speed Xs is greater than a predetermined value Sv0. If the judgment is Yes and the displacement speed Xs of the sprung portion is greater than the value Sv0, it is judged that the experienced, vibration frequency is smaller than the resonance value w1 of the sprung portion and the vehicle is in a low frequency zone. The judgment section 80 sets the allowance at the value t3. On the other hand, if the displacement speed Xs is smaller than the value Sv0, it is judged that .the vibration frequency is high. In this case, the allowance is set at a value tb enough big to hold the previous value of the damping coefficient Dki.

If the relative displacement (Xs−Xu) is greater than the value Rv0, it is Judged that the experienced frequency is in a zone where the resonance frequencies w1 and w2 are included. In this case, the allowance t is set at a value t0 which is small enough to converge the difference in the damping coefficient to substantially zero. The value of the allowance is introduced to the judgment section 80. In a low frequency zone, the relatively large allowance t3 is set so that a change of the damping characteristic of the shock absorber is relatively small. The diagonal vibration is gradually suppressed and the running stability is improved.

On the other hand, when the vibration frequency is high, the allowance is set at a big value so that the damping coefficient is not virtually changed. This is because the high frequency vibration can be damped without controlling the damping characteristics of the shock absorber. Consequently, the comfort riding comfort can be obtained in such a high frequency zone.

Hereinafter, there will be described a further embodiment in accordance with the present invention.

Figure 21:
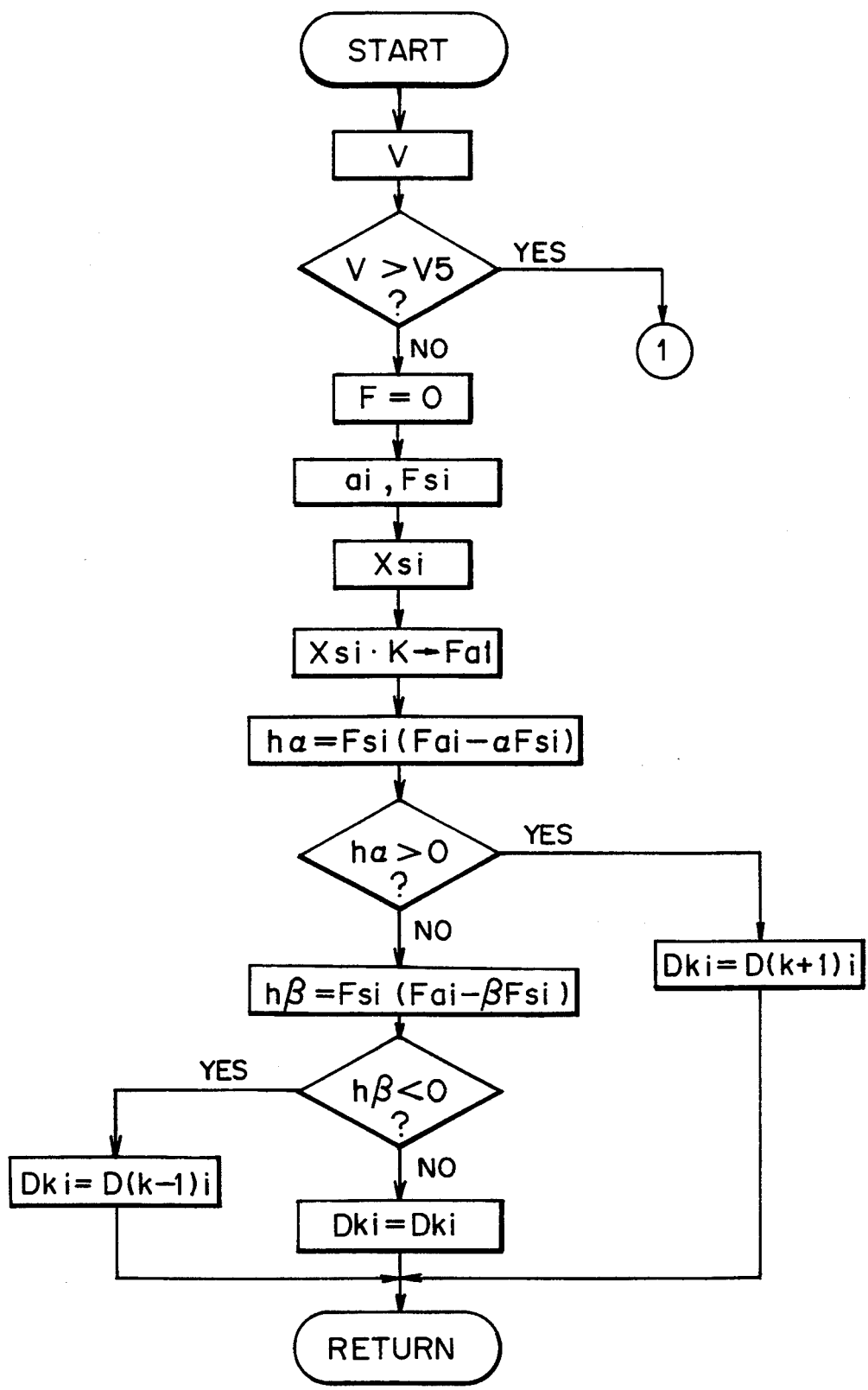
FIGS. 21 through 24 are flow charts of a control for changing the damping characteristic of the shock absorber in accordance with further embodiment of the present invention.
Figure 22:
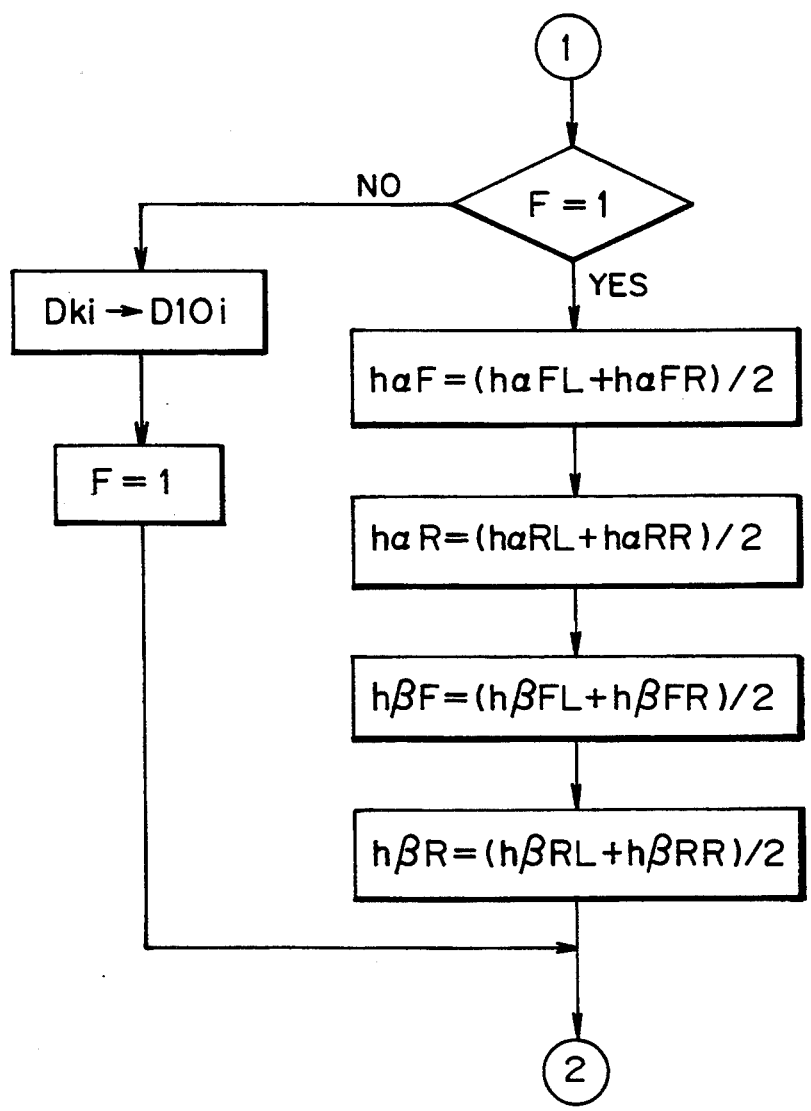

In FIG. 21, the control unit 8 judges whether or not the vehicle speed exceeds the fifth value V5. If the judgment is No and the vehicle speed V is not greater than the value V5, flag F is set at zero. If the vehicle speed is greater than the value V5, the flag F is set at 1. Then, the acceleration ai from the acceleration sensors 11, 12, 13 and 14 and the damping force Fsi from the pressure sensors 61, 62, 63 and 64 are inputted. The control unit 8 calculates the displacement speed Xsi of the sprung portion by integrating the value ai (Xsi=-Σai). Thereafter, the same procedure as shown in FIG. 11 is carried out. If the vehicle speed V is greater than the value V5, the control unit 8 judges whether or not the flag F is 1. If the flag F is not 1, the control unit 8 sets the damping coefficient at a value D10i which provides the hardest damping characteristic of the shock absorber. Then the control unit 8 sets the flag F at 1. If the vehicle speed V is greater than the value V5 and the flag F is 1, the control unit 8 calculates threshold values h$\alpha$F for front wheels, h$\alpha$R for rear wheels, h$\beta$F for front wheels and h$\beta$R for rear wheels based on the following formulas:

$$h\alpha F=(h\alpha FL+h\alpha FR)/2$$

$$h\alpha R=(h\alpha RL+h\alpha RR)/2$$

$$h\beta F=(h\beta FL+h\beta FR)/2$$

$$h\beta R=(h\beta RL+h\beta RR)/2$$

Figure 23:
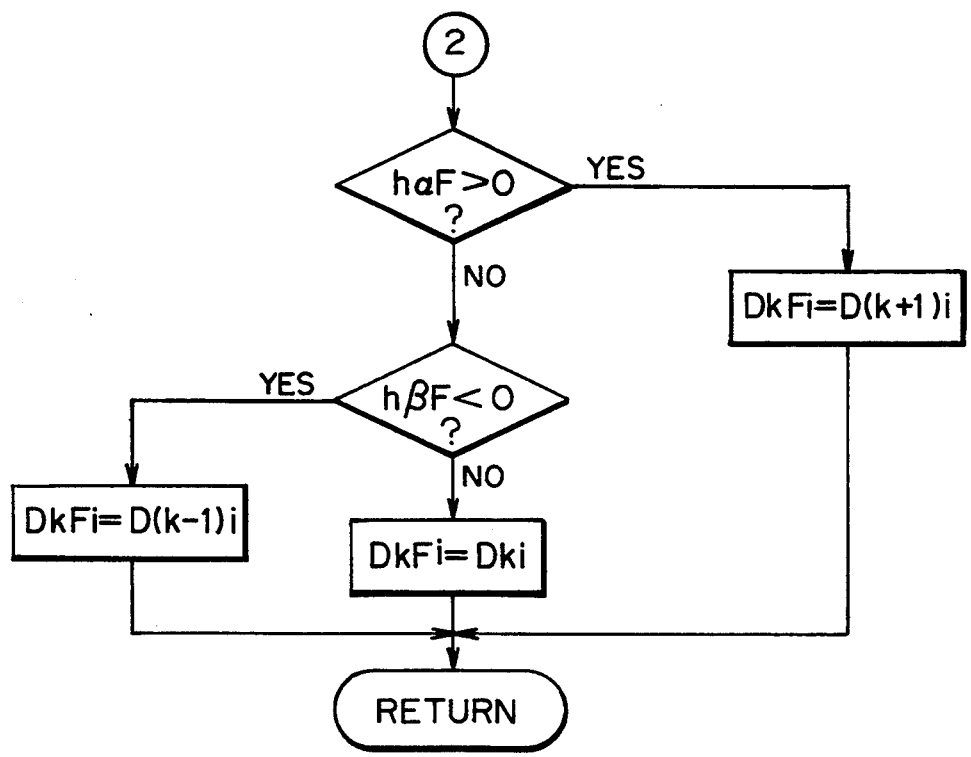
Figure 24:
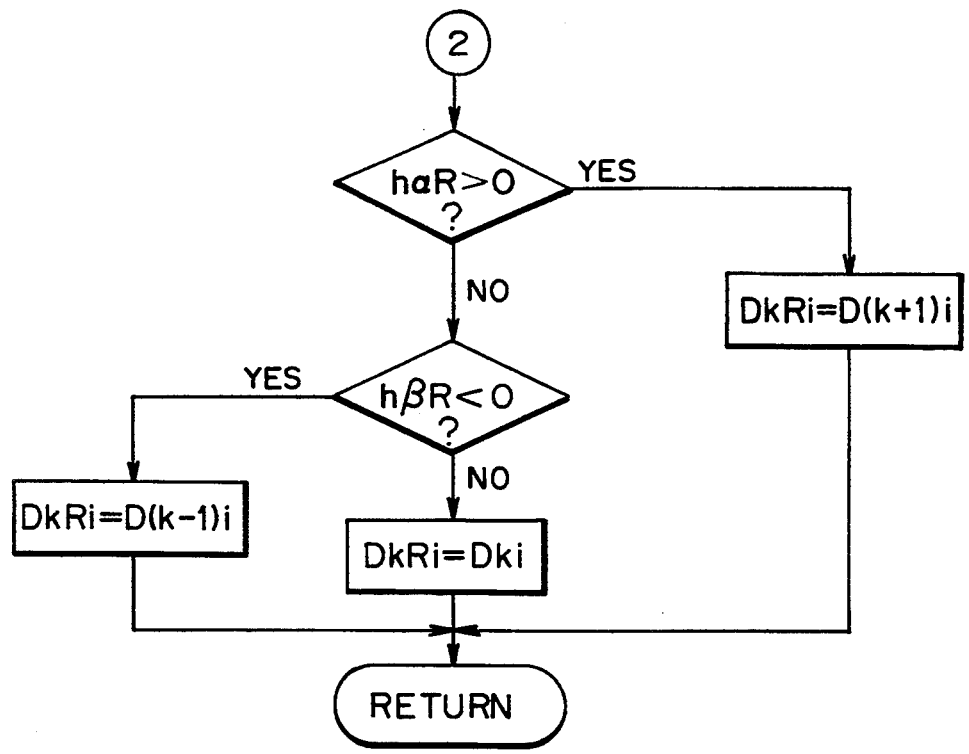

Then control unit 8 carries out the control for changing the damping coefficient DkFi (F:for front wheels) and DkRi(R:for rear wheels). As shown in FIGS. 23 and 24, the control for the damping coefficient Dki is made for the shock absorbers 1 and 3 for front wheels and the shock absorbers 2 and 4 for rear wheels respectively in accordance with the same procedure as FIG. 11.

Although the present invention has been explained with reference to a specific, preferred embodiments, one of ordinary skill in the art will recognize that modifications and improvements can be made while remaining within the scope and spirit of the present invention. The scope of the present invention is determined solely by the appended claims.

What is claimed is:

1. A vehicle suspension device comprising:
   a shock absorber, disposed between a sprung portion and an unsprung portion of a vehicle, provided for each wheel of the vehicle,
   plural control sections to which at least two shock absorbers are assigned to be controlled,
   damping changing means for changing a damping characteristic of each shock absorber assigned to the same control section,
   detecting means for detecting a difference in a damping force among said shock absorbers,
   control means for controlling damping characteristics of shock absorbers assigned to the same control section so that a damping characteristic of one of the shock absorbers assigned to the same control section is changed to increase a damping force of the one of the shock absorbers when the difference in the damping force among the shock absorbers assigned to the same control section is increased beyond a predetermined value.

2. A vehicle suspension device as recited in claim 1 wherein the control means causes the damping changing means to increase the damping force when the difference in the damping force between front and rear wheels exceeds the predetermined value.

3. A vehicle suspension device as recited in claim 1 and further comprising vertical movement detecting means for detecting a vertical movement component of the vehicle in a straight running condition and rolling detecting means for detecting a rolling movement component in a straight running condition, the control means causing the damping changing means to increase the damping force of the one of the shock absorbers harder when the rolling movement component is greater than the vertical movement component beyond the predetermined value.

4. A vehicle suspension device as recited in claim 1 and further comprising vertical movement detecting means for detecting a vertical movement component of the vehicle in a straight running condition and pitching detecting means for detecting a pitching movement component in a straight running condition, the control means causing the damping changing means to increase the damping force of the one of the shock absorbers having when the pitching movement component is greater than the vertical movement component beyond the predetermined value.

5. A vehicle suspension device as recited in claim 1 and further comprising allowance setting means for setting the predetermined value in accordance with a vehicle running condition.

6. A vehicle suspension device as recited in claim 5 wherein the allowance setting means reduces the vehicle as vehicle speed increases.

7. A vehicle suspension device as recited in claim 6 wherein the allowance setting means reduces the value as a frictional coefficient between the wheels and a road surface is reduced.

8. A vehicle suspension device as recited in claim 1 and further comprising threshold determining means for determining a threshold value of a sensibility for changing the damping characteristic of the one of the shock absorbers, the threshold determining means providing the threshold value with a value which increases the damping force of the one of the shock absorbers when it is associated with one of right and left wheels, when it has a lower damping force than the other of the shock absorbers associated with the other of the right and left wheels and when a difference in the damping force between the shock absorbers of the right and left wheels exceeds the predetermined value.

9. A vehicle suspension device as recited in claim 8 wherein the threshold determining means provides a threshold value which increases the damping force of the one of the shock absorbers when a difference in the damping force between front and rear wheels exceeds the predetermined value.

10. A vehicle suspension device as recited in claim 3 and further comprising steering angle detecting means for detecting a steering angle and threshold determining means for providing a threshold value which increases the damping force of the one of the shock absorbers when the rolling movement component is greater than the vertical movement component of the vehicle beyond the predetermined value.

11. A vehicle suspension device as recited in claim 4 and further comprising threshold determining means for providing a threshold value which increases the damping force of the one of the shock absorbers when the pitching movement component is greater than the vertical movement component of the vehicle beyond the predetermined value.

12. A vehicle suspension device as recited in claim 8 and further comprising allowance setting means for setting the predetermined value, the setting means setting the predetermined value at a relatively small value as the vehicle speed increases.

13. A vehicle suspension device as recited in claim 12 wherein the setting means reduces the predetermined value as a frictional coefficient between the wheel and road surface decreases.

14. A vehicle suspension device as recited in claim 1 and further comprising frequency speculating means for speculating the frequency of vibration of the vehicle, wherein the control means changes the predetermined value in accordance with the frequency.

15. A vehicle suspension device as recited in claim 14 wherein the control means increases the predetermined value with regard to right and left wheels when the frequency is high.

16. A vehicle suspension device as recited in claim 14 wherein the control means decreases the predetermined value with regard to right and left wheels when the frequency is low.

17. A vehicle suspension device as recited in claim 15 wherein the control means greatly increases the predetermined value so as not to restrict change of the damping characteristic of the shock absorber when the frequency is high and controls the predetermined value to become substantially zero so that the damping force of each of the shock absorbers of which damping characteristics are controlled acts in the same direction.

18. A vehicle suspension device as recited in claim 1 wherein the control means controls the shock absorbers for respective wheels independently when the vehicle speed is lower than a predetermined value, and controls the shock absorbers for front wheels and rear wheels so that the damping forces of the shock absorbers for the front wheels act in the same direction as those for the rear wheels when the vehicle speed is greater than the predetermined value.

19. A vehicle suspension device as recited in claim 1 wherein the control means controls the shock absorbers for respective wheels independently when the vehicle speed is lower than a predetermined value, and controls the shock absorbers so that the damping force of each of the shock absorbers for the front wheels acts in the same direction when the vehicle speed is greater than the predetermined value.

20. A vehicle suspension device comprising:
a shock absorber disposed between a sprung portion and an unsprung portion of a vehicle for each of a plurality of vehicle wheels,
plural control sections to which at least two shock absorbers are assigned to be controlled,
a damping changing device for independently changing a damping characteristic of the shock absorbers,
a detector for detecting a difference in a damping force among the shock absorbers for respective wheels, and
a controller for controlling the damping characteristic of the shock absorbers assigned to the same control section so as to restrict the difference in the damping force among the shock absorbers assigned to the same control section when the vehicle is in a specific running condition, the controller controlling the damping changing device so as to increase the damping force of one of the shock absorbers when the difference in the damping force among said shock absorbers assigned to the same control section exceeds a predetermined value.

21. A vehicle suspension device as recited in claim 20 wherein the controller causes the damping changing device to increase the damping force of the one, of the shock absorbers when the difference in the damping force between front and rear wheels exceeds the predetermined value.

22. A vehicle suspension device as recited in claim 20 and further comprising a vertical movement detector for detecting a vertical movement of the vehicle in a straight running condition and a rolling detector for detecting a rolling movement component in a straight running condition, the controller causing the damping changing device to increase the damping force of the one of the shock absorbers when the rolling movement component is greater than the vertical movement component beyond the predetermined value.

23. A vehicle suspension device as recited in claim 20 and further comprising a vertical movement detector for detecting a vertical movement of the vehicle in a straight running condition and a pitching detector for detecting a pitching movement component in a straight running condition, the controller causing the damping changing device to increase the damping force of the one of the shock absorbers when the pitching movement component is greater than the vertical movement component beyond the predetermined value.

* * * * *